(12) United States Patent
Shei et al.

(10) Patent No.: US 8,931,293 B2
(45) Date of Patent: Jan. 13, 2015

(54) FOOD SERVING BAR

(75) Inventors: Steven M. Shei, Fort Wayne, IN (US);
Dennis Headberg, St. Augustine, FL (US)

(73) Assignee: Duke Manufacturing Co., St. Louis, MO (US)

( * ) Notice: Subject to any disclaimer, the term of this patent is extended or adjusted under 35 U.S.C. 154(b) by 1089 days.

(21) Appl. No.: 12/595,527

(22) PCT Filed: Apr. 12, 2007

(86) PCT No.: PCT/US2007/066537
§ 371 (c)(1),
(2), (4) Date: Oct. 12, 2009

(87) PCT Pub. No.: WO2008/127330
PCT Pub. Date: Oct. 23, 2008

(65) Prior Publication Data
US 2010/0293979 A1 Nov. 25, 2010

(51) Int. Cl.
*F25D 23/12* (2006.01)
*A47J 36/24* (2006.01)
*A47J 27/17* (2006.01)
*A47J 27/18* (2006.01)

(52) U.S. Cl.
CPC .............. *A47J 36/2483* (2013.01); *A47J 36/24* (2013.01); *A47J 27/17* (2013.01); *A47J 27/18* (2013.01)
USPC .............. 62/258; 219/385; 219/432; 219/433

(58) Field of Classification Search
USPC ............................. 62/258; 219/385, 386, 387
See application file for complete search history.

(56) References Cited

U.S. PATENT DOCUMENTS

| 1,282,330 A | 10/1918 | Aller |
| 1,683,889 A | 9/1928 | Hayne |
| 1,831,861 A | 11/1931 | Henney |
| 1,912,577 A | 6/1933 | Glass |
| 2,305,319 A | 12/1942 | Pirnie |
| 2,313,786 A | 3/1943 | Daam |

(Continued)

FOREIGN PATENT DOCUMENTS

| FR | 521743 | 7/1921 |
| GB | 973994 | 11/1964 |

(Continued)

OTHER PUBLICATIONS

European Search Report for application EP 03256343 dated Jun. 15, 2004, 3 pgs.

(Continued)

*Primary Examiner* — Cheryl J Tyler
*Assistant Examiner* — David Teitelbaum
(74) *Attorney, Agent, or Firm* — Senniger Powers LLP

(57) ABSTRACT

A temperature controlled food serving having at least one channel of thermally conductive material for receiving at least one food-holding pan. The at least one channel defines an elongate pan receiving cavity for placement of the at least one food-holding pan at any desired location along the cavity. A temperature control system comprises at least one heating element for heating the at least one channel to maintain food products held in the food-holding pans at a food holding temperature. The at least one channel has at least two different temperature zones along a length of the channel so that food products in different temperature zones can be held at different food holding temperatures.

22 Claims, 25 Drawing Sheets

(56) References Cited

U.S. PATENT DOCUMENTS

| | | | |
|---|---|---|---|
| 2,360,074 A | 10/1944 | Robison | |
| 2,371,975 A | 3/1945 | Parsons | |
| 2,607,204 A | 8/1952 | Kleist | |
| 2,693,089 A | 11/1954 | Teeter | |
| 2,797,560 A | 7/1957 | Kooiker | |
| 2,850,196 A * | 9/1958 | Feltz | 220/4.12 |
| 2,890,863 A | 6/1959 | Scal | |
| 2,893,805 A | 7/1959 | Ferguson | |
| 3,160,452 A | 12/1964 | Rothman | |
| 3,222,114 A | 12/1965 | Stentz | |
| 3,308,633 A | 3/1967 | Kritzer, Jr. | |
| 3,317,709 A | 5/1967 | Beasley | |
| 3,334,414 A | 8/1967 | Hocker | |
| 3,388,561 A | 6/1968 | Parrott | |
| 3,411,254 A | 11/1968 | Kessler | |
| 3,491,548 A | 1/1970 | Christiansen | |
| 3,527,925 A | 9/1970 | Toyooka | |
| 3,619,560 A | 11/1971 | Buiting | |
| 3,678,248 A | 7/1972 | Tricault | |
| 3,780,794 A | 12/1973 | Staub | |
| 3,798,418 A | 3/1974 | Reik | |
| 3,806,701 A * | 4/1974 | Scott | 219/438 |
| 3,832,862 A | 9/1974 | Ingels | |
| 3,869,596 A | 3/1975 | Howie | |
| 3,875,370 A | 4/1975 | Williams | |
| 3,952,794 A | 4/1976 | Spanoudis | |
| 3,971,231 A | 7/1976 | Derry | |
| 4,052,589 A | 10/1977 | Wyatt | |
| 4,139,763 A | 2/1979 | McMullan | |
| 4,210,675 A | 7/1980 | Liebermann | |
| 4,213,498 A | 7/1980 | Vandenbossche | |
| 4,253,013 A | 2/1981 | Mabuchi | |
| 4,268,741 A | 5/1981 | O'Brien | |
| 4,386,703 A | 6/1983 | Thompson | |
| 4,393,299 A | 7/1983 | McWilliams | |
| 4,407,143 A | 10/1983 | Wolfe | |
| 4,423,578 A | 1/1984 | Meigs | |
| 4,459,472 A | 7/1984 | Morris | |
| 4,523,078 A | 6/1985 | Lehmann | |
| 4,575,928 A | 3/1986 | Starnes | |
| 4,593,752 A | 6/1986 | Tipton | |
| 4,615,183 A | 10/1986 | Juncos | |
| 4,641,468 A | 2/1987 | Slater | |
| 4,754,587 A | 7/1988 | Glaser | |
| 4,782,665 A | 11/1988 | Wolfe | |
| 4,802,340 A | 2/1989 | Johnson | |
| 4,852,741 A | 8/1989 | Van Benschoten | |
| 4,856,579 A | 8/1989 | Wolfe | |
| 4,870,835 A | 10/1989 | Wolfe | |
| 5,010,741 A | 4/1991 | Gelatini | |
| 5,117,649 A | 6/1992 | Mangini | |
| 5,168,719 A | 12/1992 | Branz | |
| 5,245,150 A | 9/1993 | Grandi | |
| 5,247,807 A | 9/1993 | Jarman | |
| 5,355,687 A | 10/1994 | Carpenter | |
| 5,363,672 A | 11/1994 | Moore | |
| 5,404,935 A | 4/1995 | Liebermann | |
| 5,412,181 A | 5/1995 | Giamati | |
| 5,449,232 A | 9/1995 | Westbrooks, Jr. | |
| 5,551,774 A | 9/1996 | Campbell | |
| 5,566,838 A | 10/1996 | Tseng | |
| 5,568,714 A | 10/1996 | Peterson | |
| 5,655,595 A | 8/1997 | Westbrooks, Jr. | |
| 5,895,104 A | 4/1999 | Grandi | |
| 5,927,092 A | 7/1999 | Kushen | |
| 5,961,866 A | 10/1999 | Hansen | |
| 6,000,236 A | 12/1999 | Haasis | |
| 6,031,208 A | 2/2000 | Witt | |
| 6,073,547 A | 6/2000 | Westbrooks, Jr. | |
| 6,085,535 A | 7/2000 | Richmond | |
| 6,145,333 A | 11/2000 | Richmond | |
| 6,151,905 A | 11/2000 | Smith | |
| 6,202,432 B1 | 3/2001 | Haasis | |
| 6,262,398 B1 | 7/2001 | Busquets | |
| 6,373,031 B1 | 4/2002 | Barrow | |
| 6,385,990 B1 | 5/2002 | Lee | |
| 6,427,761 B1 | 8/2002 | Georges | |
| 6,434,961 B2 | 8/2002 | Richmond | |
| 6,570,140 B2 | 5/2003 | Karacsony | |
| 6,637,320 B2 | 10/2003 | Grandi | |
| 6,735,971 B2 | 5/2004 | Monroe | |
| 6,849,830 B2 | 2/2005 | Damiano | |
| 6,910,311 B2 | 6/2005 | Lindberg | |
| 6,910,347 B2 | 6/2005 | Monroe | |
| 6,999,312 B1 | 2/2006 | Garnett | |
| 7,025,121 B2 | 4/2006 | Whitehead | |
| 7,053,340 B2 | 5/2006 | Wilde | |
| 7,126,094 B2 | 10/2006 | Bower | |
| 7,132,628 B2 | 11/2006 | Ptasienski | |
| 7,212,718 B2 | 5/2007 | Sato | |
| 7,348,519 B2 | 3/2008 | Federspiel | |
| 2002/0038799 A1 | 4/2002 | Laken | |
| 2002/0038800 A1 | 4/2002 | Laken | |
| 2002/0038801 A1 | 4/2002 | Laken | |
| 2003/0108647 A1 | 6/2003 | Grandi | |
| 2004/0074399 A1 | 4/2004 | Zhou | |
| 2005/0009070 A1 | 1/2005 | Arciniegas | |
| 2005/0183382 A1 | 8/2005 | Jensen | |
| 2006/0081627 A1 | 4/2006 | Shei | |
| 2006/0150826 A1 | 7/2006 | Federspiel | |
| 2006/0175321 A1 | 8/2006 | Ptasienski | |
| 2007/0023419 A1 | 2/2007 | Ptasienski | |
| 2008/0041843 A1 | 2/2008 | Bower | |
| 2009/0025325 A1 | 1/2009 | Gillespie | |
| 2009/0090734 A1 | 4/2009 | Wittern, Jr. | |

FOREIGN PATENT DOCUMENTS

| | | |
|---|---|---|
| GB | 2152648 A | 2/2010 |
| KR | 2002078146 | 10/2002 |
| WO | 0033712 A1 | 6/2000 |
| WO | 03073030 A1 | 9/2003 |
| WO | 2009007781 A2 | 1/2009 |
| WO | 2009049094 A1 | 4/2009 |

OTHER PUBLICATIONS

Kairak Innovations, Exhibit A—Pan Chiller System, drawn Feb. 7, 1994, submitted to Patent Office Mar. 9, 1994 during prosecution of U.S. Patent No. 5,355,687, 1 pg.

Kairak Innovations, Declaration of Jeff Hatch including Exhibit A-A-Pan Chiller System, Declaration signed on May 27, 1994, Exhibit A-A drawn May 23, 1994, submitted to Patent Office Jun. 2, 1994 during prosecution of U.S. Patent No. 5,355,687, 7pgs.

* cited by examiner

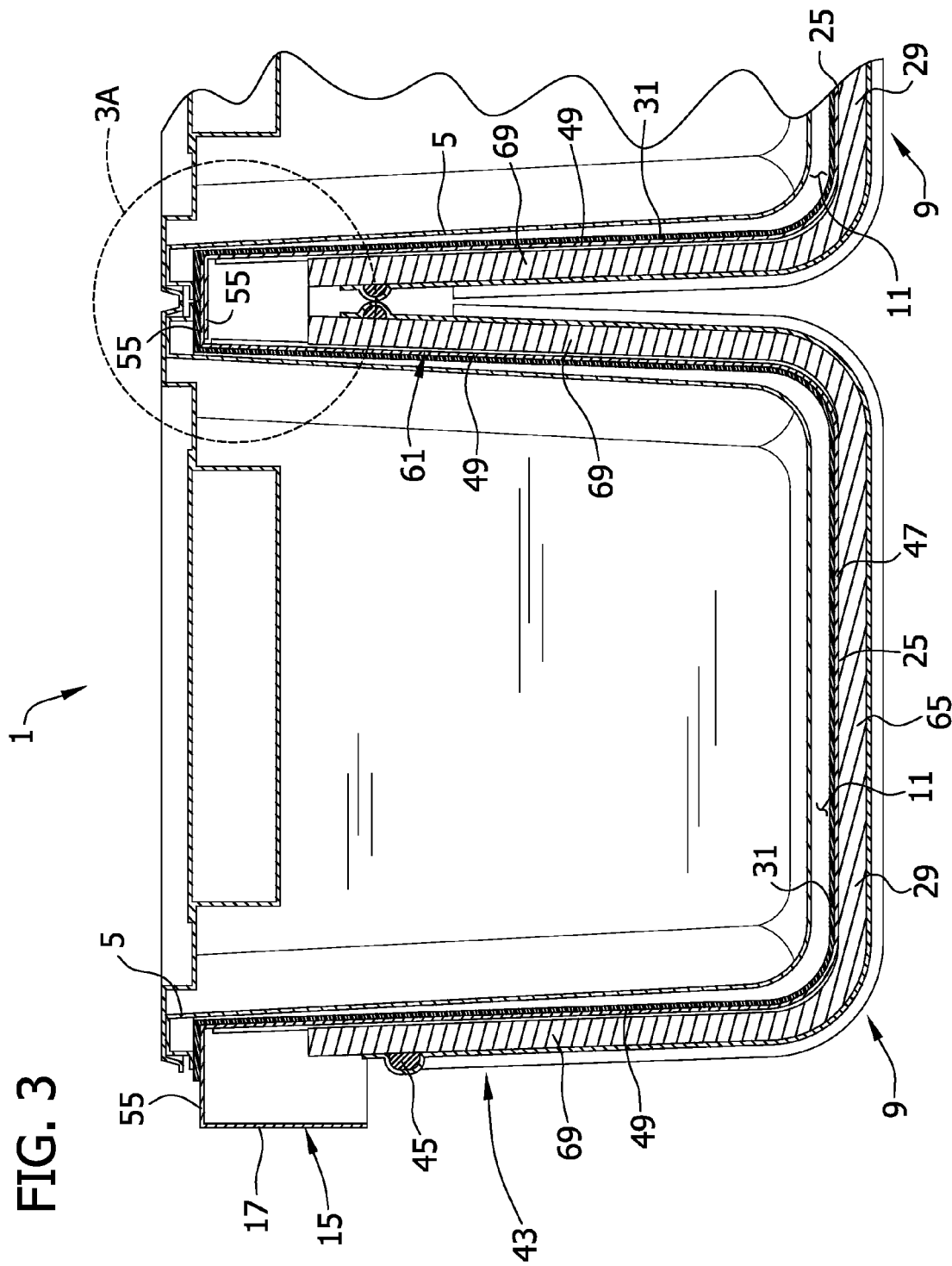

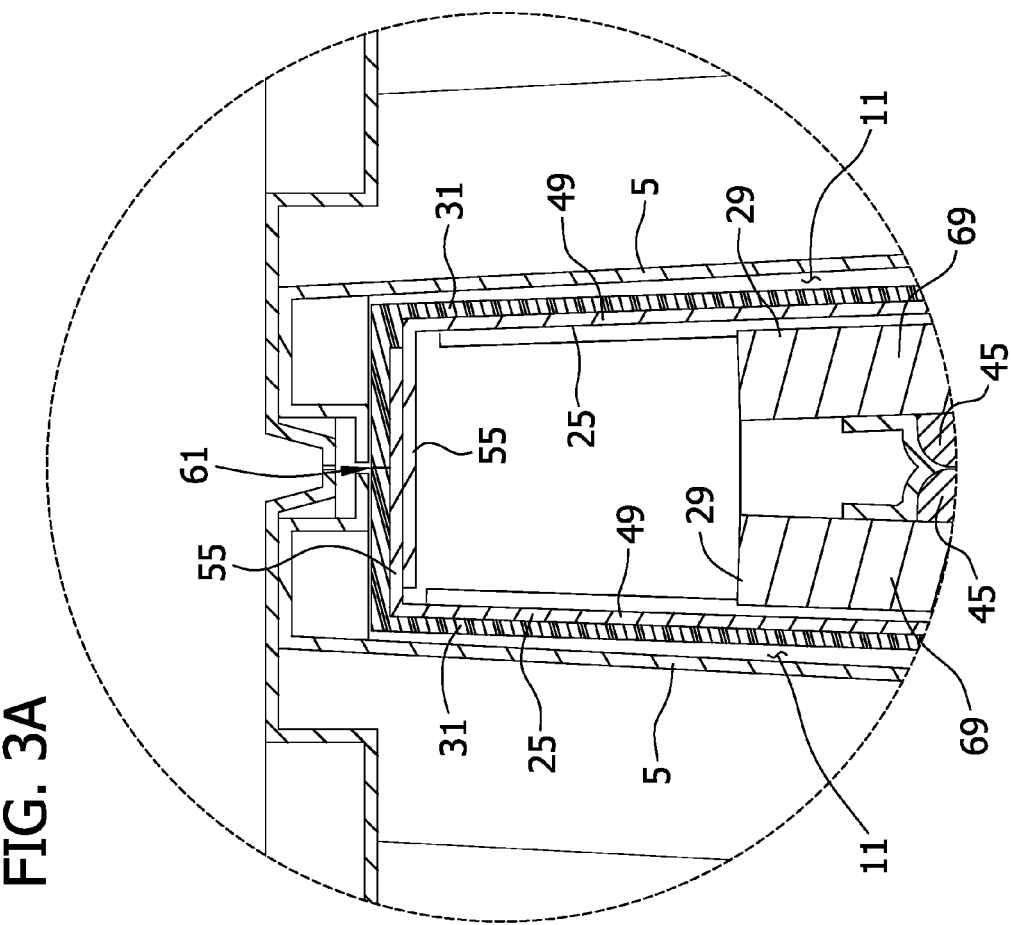

FOOD SERVING BAR

BACKGROUND OF THE INVENTION

This invention relates generally to the food service industry and more particularly to a food serving bar for maintaining food at a suitable temperature prior to service to consumers.

This invention is generally in the same field as U.S. Pat. No. 6,735,971, assigned to Duke Manufacturing Company and incorporated herein by reference, which discloses a temperature controlled food serving bar for heating or cooling food products held in food-holding pans in the food serving bar.

The present invention is more specifically directed to a food serving bar that maintains hot food at a proper temperature before serving. Such a food serving bar is often used in, for example, the fast food service industry to maintain separate ingredients (e.g., meat, cheese, rice, beans, etc.) at elevated temperatures prior to assembly of a hot finished food product (e.g., taco, burrito, etc.).

One hot food serving bar frequently used in the fast food service industry, commonly referred to as a steam table or bain-marie, comprises placing rows of food-holding pans in or above a bath of heated water to maintain food held in the food-holding pans at an elevated temperature. This existing design is relatively inefficient in that the entire heated bath of water must be maintained at an elevated temperature which requires a large amount of power to heat the water which, in turn, is used to heat the food-holding pans. Also, steam tables result in increased humidity and temperature of the operating environment surrounding the table as a result of the steam generated by heating the water bath. The increased heat and humidity in the surrounding environment increases cooling demands on the HVAC system of a restaurant. Also, the increased humidity of the surrounding environment requires additional cleaning and maintenance as a result of steam condensing on other equipment adjacent the steam table. Further, food held in steam tables is easily spilled into the hot water bath requiring frequent clean up. Also, the holding well for the water bath must be drained and cleaned on a frequent (e.g., daily) basis to maintain sanitary operating conditions of the steam table. Moreover, existing hot food serving bars do not allow independent temperature control of rows of food-holding pans or independent temperature control of individual food-holding pans in the food serving bar.

Therefore, a need exists for a food serving bar that effectively and efficiently holds food products, especially heated food products for preparation of a finished food product.

SUMMARY OF THE INVENTION

In general, a temperature controlled food serving bar of the present invention comprises at least one channel of thermally conductive material extending lengthwise of the food serving bar for receiving at least one food-holding pan. The at least one channel defines an elongate pan-receiving cavity extending lengthwise of the food serving bar for placement of the at least one food-holding pan in the cavity. The at least one channel comprising a plurality of thermally separate channel sections disposed in end-to-end relation with respect to one another. The channel sections define different temperature zones along a length of the channel. Adjacent ends of adjacent channel sections are separated by a thermal barrier. A temperature control system is provided for heating the plurality of thermally separate channel sections to different temperatures whereby food products in the different temperature zones can be held at different food holding temperatures.

Other objects and features of the present invention will be in part apparent and in part pointed out hereinafter.

BRIEF DESCRIPTION OF THE DRAWINGS

FIG. 3 is a partial vertical section of FIG. 2 showing a channel of the food serving bar;

FIG. 3A is an enlarged detail of FIG. 3;

Corresponding parts are designated by corresponding reference numbers throughout the drawings.

DETAILED DESCRIPTION

Figure 1:
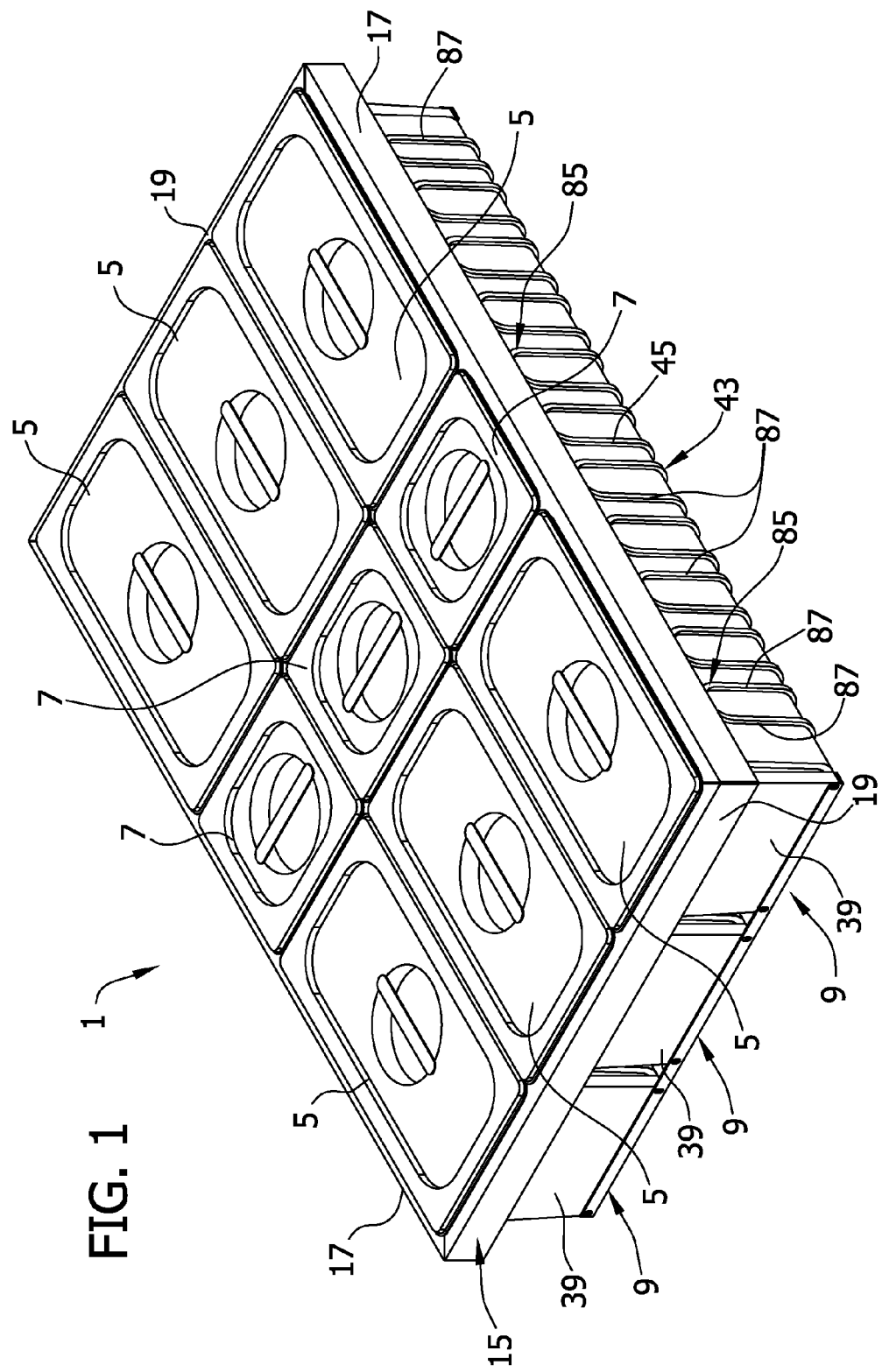
FIG. 1 is a perspective of a food serving bar of a first embodiment of the present invention.
Figure 2:
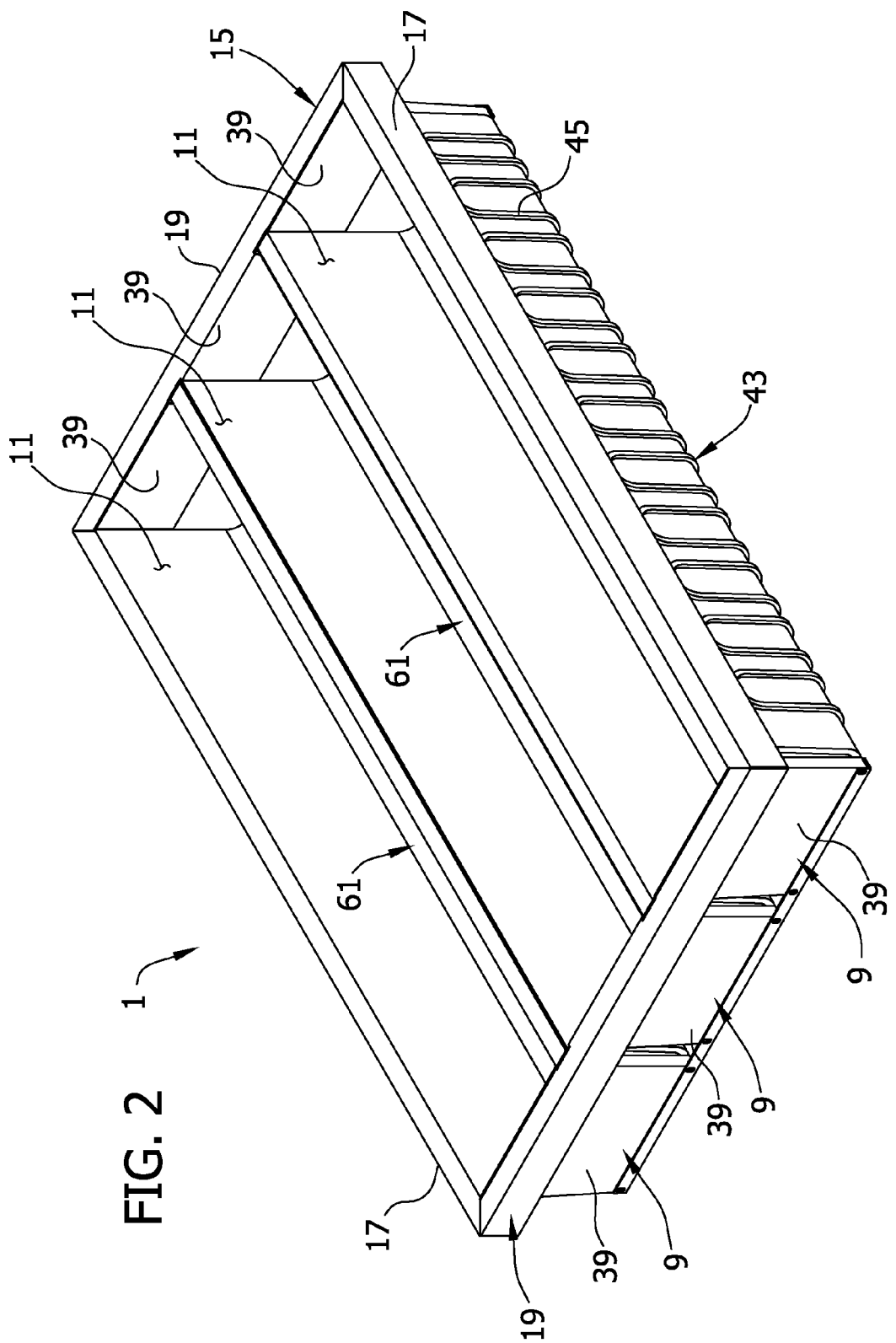
FIG. 2 is a perspective of the first embodiment with food-holding pans removed.

Referring to FIG. 1, a food serving bar of the present invention is designated in its entirety by the reference numeral 1. The food serving bar 1 is particularly useful in heating food products (not shown) held in food-holding pans 5 in the serving bar. The food serving bar 1 may be supplied as retrofit unit for installation in the water-holding well of an existing steam table unit (not shown) or other existing food serving bar, or the food serving bar may be supplied as a complete unit having a cabinet (not shown) for supporting the food serving bar.

In the embodiment of FIGS. 1-4, the food serving bar 1 comprises three channels, generally designated 9, each defining an elongate pan receiving cavity 11 extending lengthwise of the food serving bar for placement of the food-holding pans 5 at any desired location along the cavity. The food serving bar 1 has a frame, generally designated 15, around the perimeter of the serving bar having two, generally parallel, longitudinal sides 17 and two generally parallel ends 19. The frame 15 supports the channels 9 of the food serving bar 1 in a cabinet (not shown) that may be fabricated as part of the food serving bar, a cabinet that is reused from an existing food serving unit (e.g., steam table), or other suitable support structure. Regardless of the support structure, the food serving bar 1 is typically located in the food preparation area of a restaurant generally near a countertop used in preparing finished food products using ingredients held in the food-holding pans 5.

As shown in the particular embodiment of FIG. 3, each channel 9 has multiple layers, including a heat conductive layer 25 extending lengthwise of the food serving bar 1, an outer heat sink layer 29 attached to the exterior of the heat conductive layer, and an inner layer 31 disposed between the heat conductive layer and the food pans 5 for protecting the heat conductive layer from corrosion due to spillage of food products from the food pans. In the embodiment of FIGS. 1-4, each layer 25, 29, 31 of the channel 9 has a generally U-shaped cross-section with a bottom wall and two side walls. The inner layer 31 defines the pan receiving cavities 11 extending the length of the food serving bar 1. The ends of each channel are closed by end caps 39. In the illustrated embodiment, three channels 9 are shown, but this number can vary (e.g., two, four or more than four). The food serving bar 1 has a temperature control system, generally designated 43, comprising a heating element 45 attached to the exterior surface of each outer heat sink layer 29 for heating a respective channel 9. When the temperature control system 43 is operated, the heating element 45 heats the heat sink layer 29 to distribute heat uniformly throughout the bottom wall and side walls of each channel 9 so that the entire food product in a respective food-holding pan 5 is held at an optimum temperature. As used herein, the term "heating element" refers to any type of device for heating a channel 9, including one or more electrical resistance heaters, one or more runs of thermal fluid lines, a forced air system in which heated air is directed to the channels to heat them, or an air impingement system in which jets of high pressure, high velocity, heated air are directed onto the walls of the channels. It is understood that the temperature control system 43 may deliver approximately 50-500 watts of heat per foot of length of each channel 9 and that other amounts of heat may be delivered by the temperature control system without departing from the scope of this invention.

In the embodiment shown in FIGS. 1-4, each heat conductive layer 25 of the channel 9 comprises a bottom wall 47, a pair of side walls 49 extending up from the bottom wall, and longitudinal flanges 55 along the upper ends of the side walls. The flanges 55 project laterally outward from respective side walls 49 in a plane generally parallel to the bottom wall 47 of the heat conductive layer 25. The outboard flanges 55 of the two outer channels 9, only one of which is shown in FIG. 3, overlie respective longitudinal sides 17 of the frame 15 of the food serving bar 1. The inboard flanges 55 of the two outer channels 9 overlie respective flanges of the middle channel. The adjacent side walls 49 and overlapping flanges 55 of adjacent heat conductive layers 25 form dividers, generally designated 61, that extend the length of the food serving bar 1 to separate respective pan receiving cavities 11. The dividers 61 may have wear resistant caps (not shown) and may contain insulation (not shown) to reduce heat losses from the heating elements 45. Thermal barriers in the dividers 61 and/or wear resistant caps may be used to insulate the top surfaces of the food serving bar 1 and thus maintain them cooler to the touch.

The heat conductive layer 25 may be fabricated of bent sheet metal, or extruded or cast of thermally conductive material (e.g., aluminum or stainless steel) and may comprise a single part or multiple parts attached together to form the layer. In the illustrated embodiment, the heat conductive layer 25 comprises 18-gauge (1.2 mm) thick stainless steel, but the heat conductive layer may comprise other materials and may have other thicknesses without departing from the scope of this invention.

In the embodiment of FIGS. 1-4 the outer heat sink layer 29 of each channel 9 comprises an elongate extrusion attached to the exterior surface of the heat conductive layer 25 of each channel. The outer heat sink layer 29 preferably has an increased thickness compared to the heat conductive layer 25 so that outer layer conducts and distributes heat from the heating elements 45 uniformly throughout the longitudinal length of the bottom wall 47 and side walls 49 of the heat conductive layer of each channel 9. In one embodiment, the heat sink layer 29 comprises a thermally conductive metal (e.g., aluminum) having a thickness of at least ⅛ inch (3.2 mm), but it is understood that other materials and thickness may be used. In the illustrated embodiment, the outer heat sink layer 29 is attached to the heat conductive layer 25 of each channel 9 by a heat conductive adhesive (e.g., thermal mastic) between the layers, but it will be understood that other suitable fasteners known in the art may be used (e.g., threaded fasteners, rivets, non-conductive adhesives, etc.).

In the embodiment of FIGS. 1-4, the outer heat sink layer 29 of each channel 9 has a generally U-shaped cross-section with a bottom wall 65 and two side walls 69 extending up from the bottom wall. Alternatively, the heat sink layer 29 may comprise only a single bottom wall in contact with the bottom wall 47 of the heat conductive layer 25 (see FIG. 5, for example). Also, the heat sink layer 29 may vary from the illustrated embodiments in that the side walls 69 may extend up to respective flanges 55 of the heat conductive layer 25, or the side walls may extend up from the bottom wall 65 a distance less than illustrated in FIGS. 1-4 without departing from the scope of this invention. Further, while the heat sinks 29 of the illustrated embodiments extend the full length of the channels 9, it is contemplated that the heat sink may be omitted from portions of one or more channels or from an entire channel or channels of the food serving bar 1 without departing from the scope of this invention.

Figure 4:
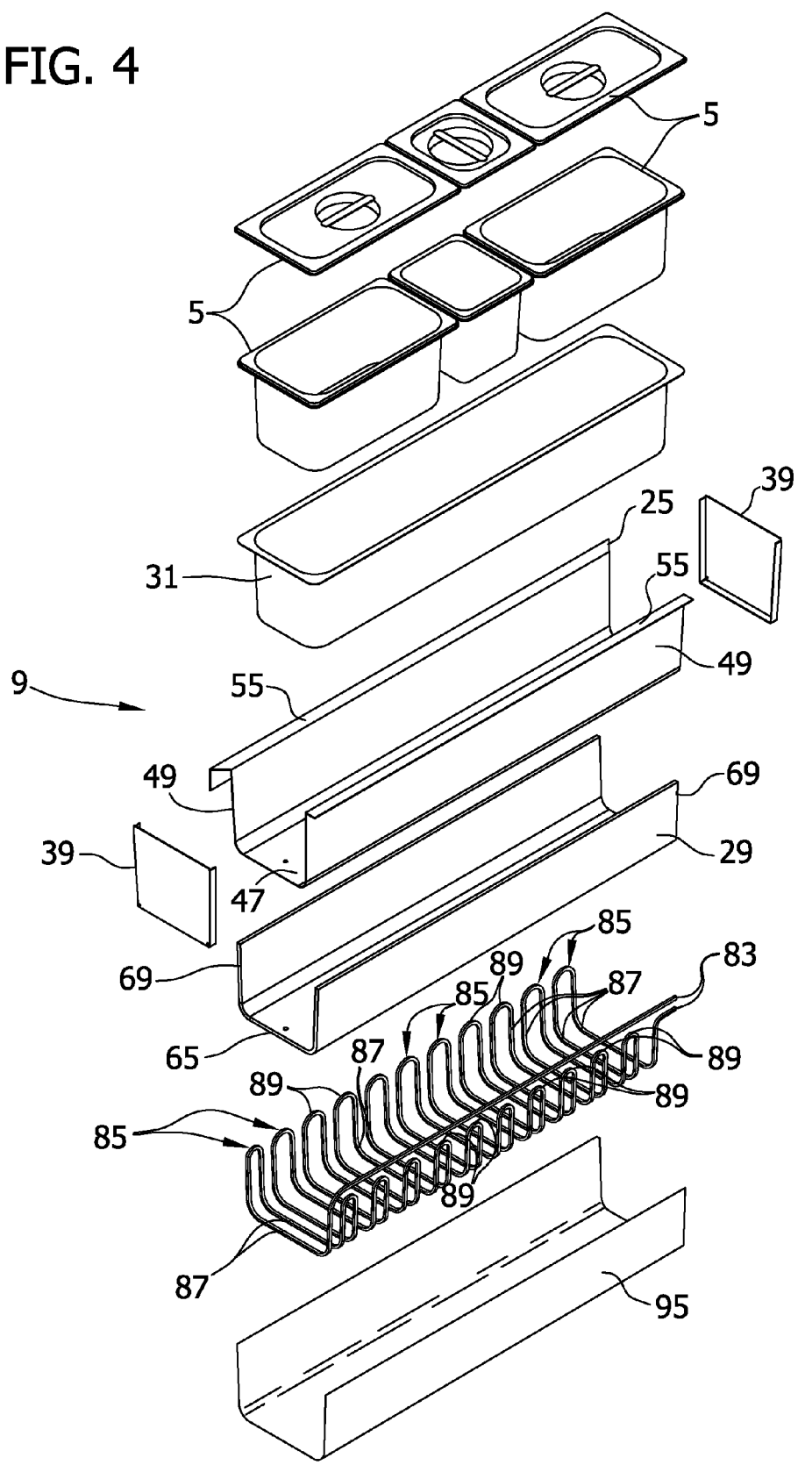
FIG. 4 is an exploded perspective of a channel of the first embodiment of the food serving bar and a food-holding pan in the channel.

As shown in FIGS. 3 and 4, the inner layer 31 of each channel 9 comprises a liner that protects the bottom wall 47 and side walls 49 of the heat conductive layer 25 of the channel from contact with food products spilled from the food-holding pans 5 held in the channel. In the illustrated embodiment, each liner 31 extends longitudinally of the food serving bar 1 and is shaped to be received in the channel 9 for contact with the interior surface of the heat conductive layer 25. Preferably, the liner 31 is made from a thermally conductive material (e.g., plastic) that is corrosive resistant and easy to clean. In the illustrated embodiment, each liner 31 is shaped similarly to each heat conductive layer 25 so that the each liner overlays a respective heat conductive layer and is disposed between the food-holding pan 5 and the heat conductive layer. It is understood that the liners 31 may have other shapes and sizes without departing from the scope of this invention. For example, the liner 31 may comprise separate longitudinal sections that fit into a channel so that the liner may be omitted from portions of the channel. Alternatively, the entire liner 31 may be omitted from one or more of the channels 9 without departing from the scope of this invention. Also, each liner 31 could be sprayed on or otherwise applied to the inner surface of the heat conductive layer 25 or each liner could be a molded part.

In the embodiment of FIGS. 1 and 4, the temperature of each channel 9 is controlled by a heating element 45 comprising an electric resistance heating element that extends from adjacent one end of the channel 9 to adjacent the other end of the channel to provide uniform heating of the channel. In the illustrated embodiment each heating element 45 has two terminals 83 adjacent one end of a respective channel for connection to a power supply. When electric current is passed through a respective heating element 45, heat from the heating element passes through the layers 25, 29, 31 of each channel to heat the food-holding pans 5 in each channel and food products contained therein. As shown in FIG. 4, each heating element 45 is arranged in a serpentine fashion so that it is in heat conductive contact with both side walls 69 and the bottom wall 65 of the heat sink layer of a respective channel 9. In the embodiment shown in FIG. 4, each heating element 45 comprises a series of loops, generally indicated 85, spaced at intervals lengthwise of the channel 9, each loop having a pair of generally parallel reaches 87 extending across the bottom wall of the channel and up on opposite side wall of the channel, and a bend 89 connecting the generally parallel reaches of the loop. In the illustrated embodiment, the heating element 45 is configured to have a substantially uniform watt density from one end to the other so that the heat delivered to the surface area of the heat conductive layer 25 is substantially uniform along the length of the channel 9. As a result, adjacent food-holding pans 5 held in each channel 9 are heated to approximately the same temperature.

It is understood that the heating element 45 and heat sink 29 may be arranged to directly heat one or both of the side walls 49 of the conductive layer 25 without departing from the scope of this invention. Also, the heating element 45 of the present invention may comprise two or more separate sections of different or the same watt ratings that are separately connected to a supply of current. Further, the heating element 45 may comprise a single heating member having a variably watt density along its length so that a varying amount of heat is generated by the flow of current through the heating element.

In one embodiment (FIGS. 1-4), each heating element 45 is held in contact with the heat sink layer 29 of each channel 9 by a containment layer of material 95 (e.g., aluminum foil) that covers the heating element and is attached to the exterior of the heat sink layer by adhesive. A layer of insulation may surround the heating element 45 between the containment layer 95 and the exterior surface of the heat sink layer 29 to prevent heat losses from the heating elements. It is understood that the heating elements 45 may be secured to the channels 9 by other attachment methods (e.g., brackets at locations along the heating element) without departing from the scope of this invention.

Figure 5:
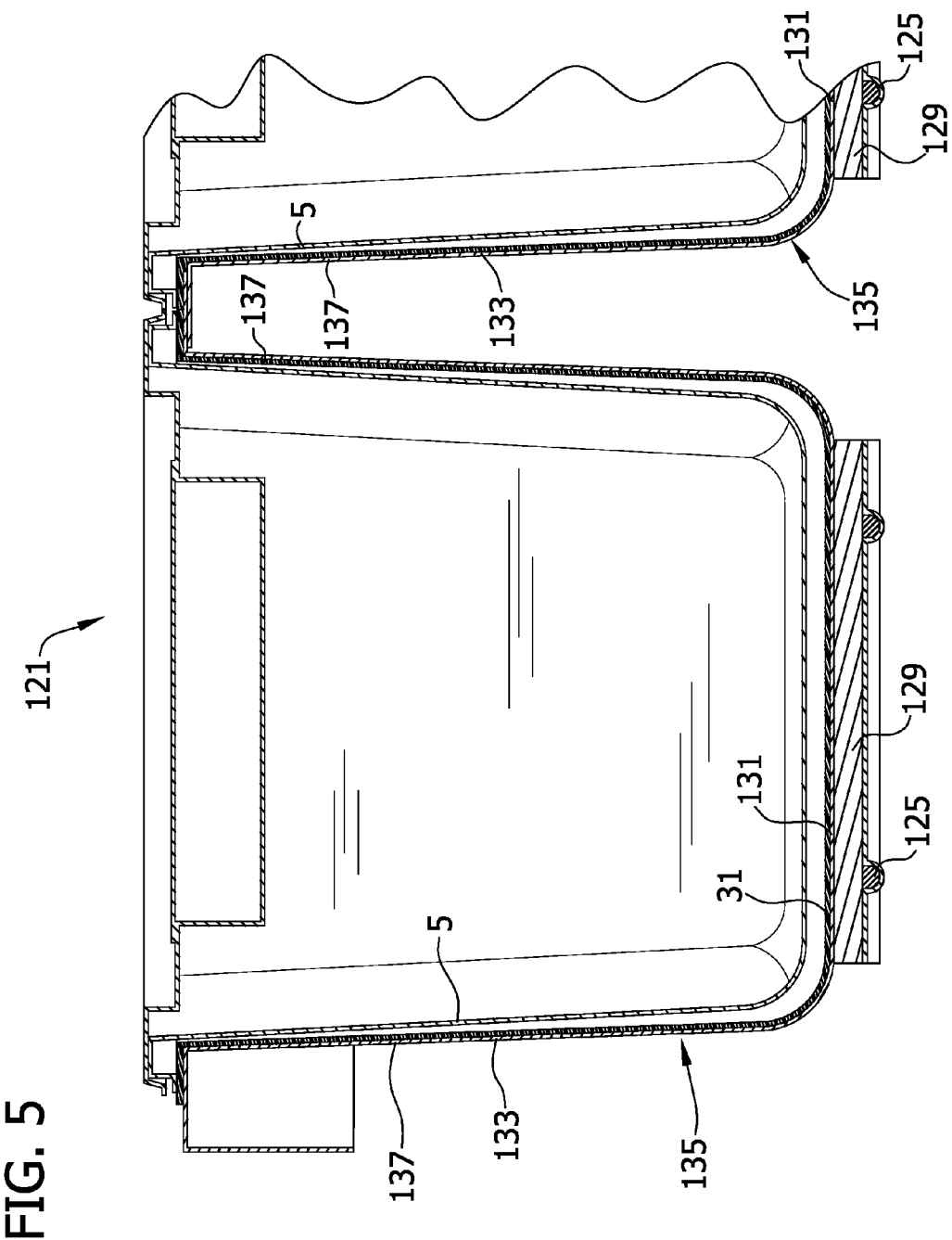
FIG. 5 is a view similar to FIG. 3 but showing a second embodiment of the present invention.
Figure 6:
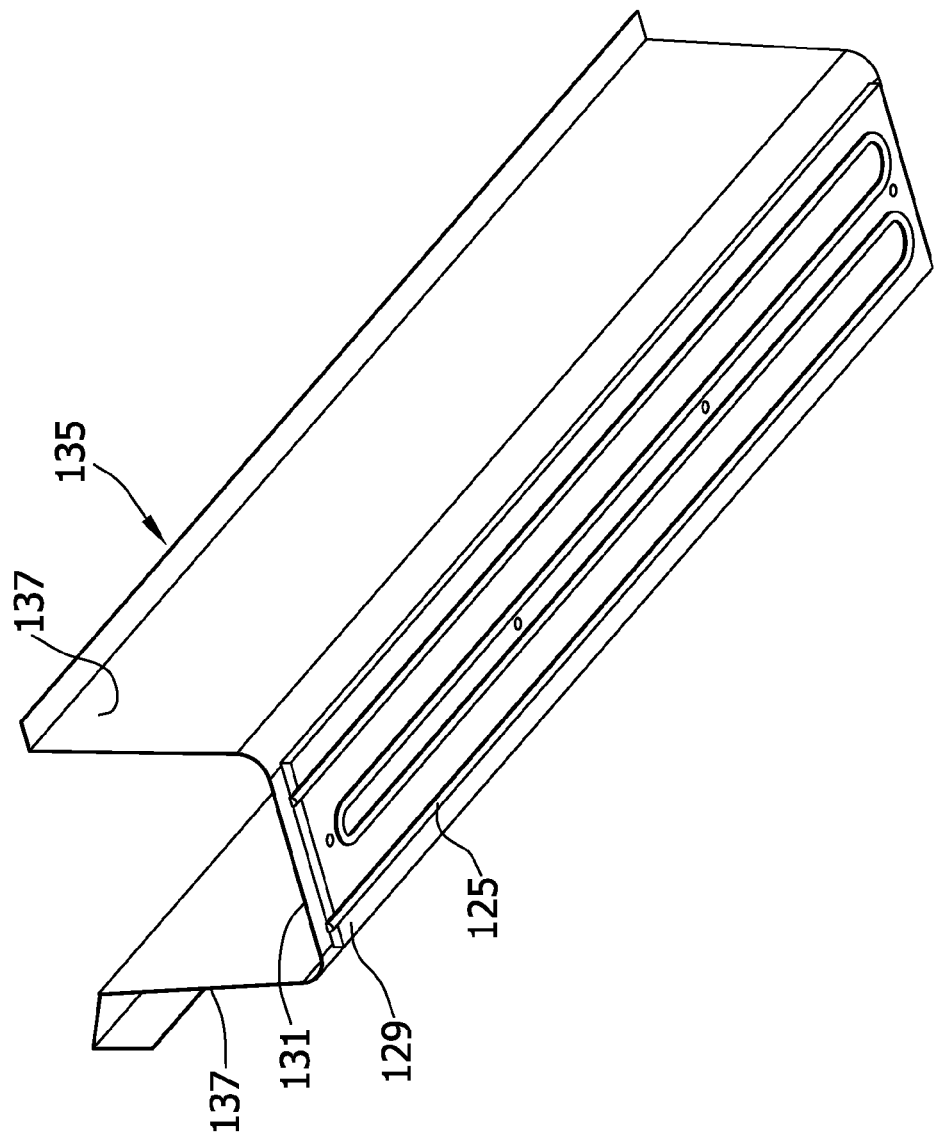
FIG. 6 is a bottom detail perspective of a channel of the second embodiment.

FIGS. 5 and 6 show an alternative embodiment of the food serving bar 121 having one or more heating elements 125 in contact with a heat sink layer 129 attached to the bottom wall 131 of the heat conductive layer 133 of a channel, generally designated 135. In this embodiment, heat is applied only to the bottom of the channel 135, but it is understood that heat is distributed to the side walls 137 of the heat conductive layer 133 by conduction so that the side walls and the bottom wall 131 of the heat conductive layer heat the food-holding pans 5. It is understood that the heating element 125 and heat sink 129 may be arranged to directly heat one or both of the side walls 137 of the conductive layer 133 without departing from the scope of this invention. Also, the heating element 125 of the present invention may comprise two or more separate sections of different watt ratings that are separately connected to a supply of current, or the heating element may comprise a single heating member having a variably watt density along its length so that a varying amount of heat is generated by the flow of current through the heating element.

Figure 7:
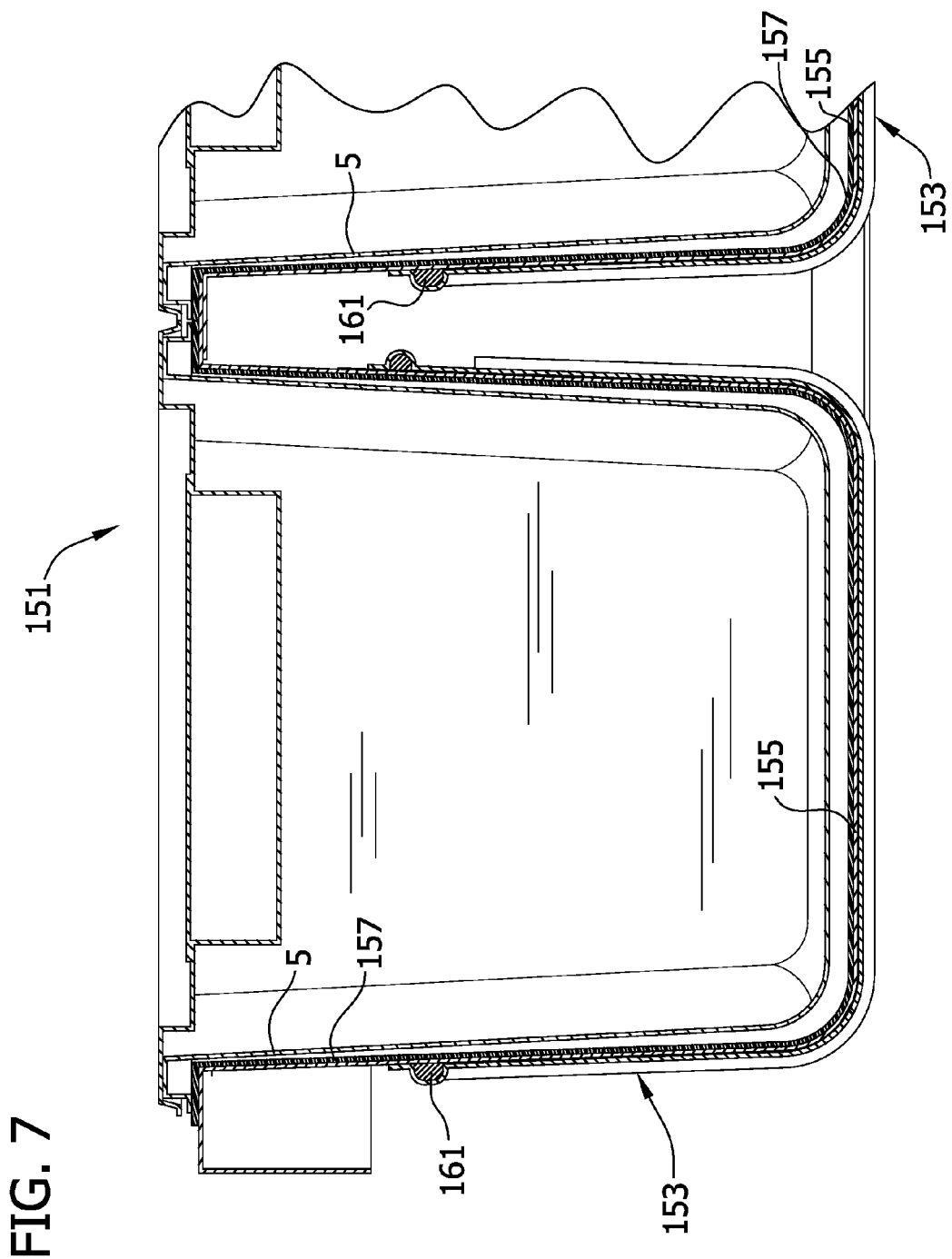
FIG. 7 is a view similar to FIG. 5 but showing a third embodiment of the present invention.
Figure 8:
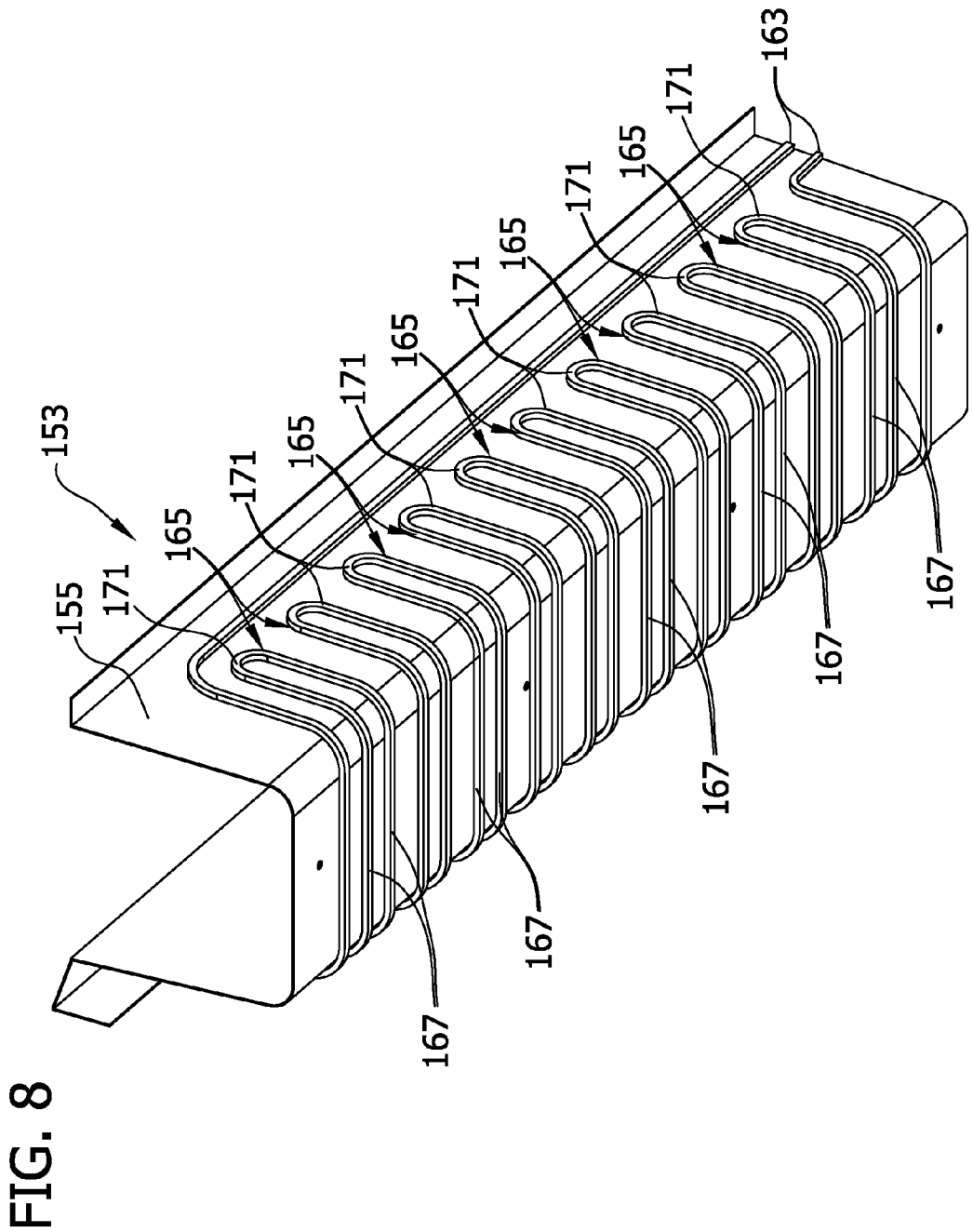
FIG. 8 is a bottom detail perspective of a channel of the third embodiment.

FIGS. 7 and 8 illustrate an alternative embodiment of the food serving bar 151 in which the channels 153 extending lengthwise of the food serving bar each comprise a heat conductive layer 155 and a liner layer 157 on top of the heat conductive layer. (The heat sink layer 29 of the first embodiment is eliminated.) In this embodiment, the heating elements 161 of the temperature control system are attached directly to the heat conductive layers 155 of the channels 153. As shown in FIG. 7, the heating elements 161 are attached in a similar manner as the heating elements of the previous embodiments and are arranged to provide uniform heating along the lengths of the channels 153. As shown in FIG. 8, each heating element 161 has two terminals 163 adjacent one end of a respective channel 153 for connection to a power supply (not shown). The heating elements 161 are arranged similar to the elements 45 of the first embodiment in that each heating element comprises a series of loops, generally indicated 165, spaced at intervals lengthwise of the channel 153, each loop having a pair of generally parallel reaches 167 extending across the bottom wall of the channel and up on opposite side wall of the channel, and a bend 171 connecting the generally parallel reaches of the loop. It is understood that the heating elements 161 of this embodiment may vary in any of the ways discussed above, or any other way known in the art, to provide a varying amount of heat along the length of each channel.

Figure 9:
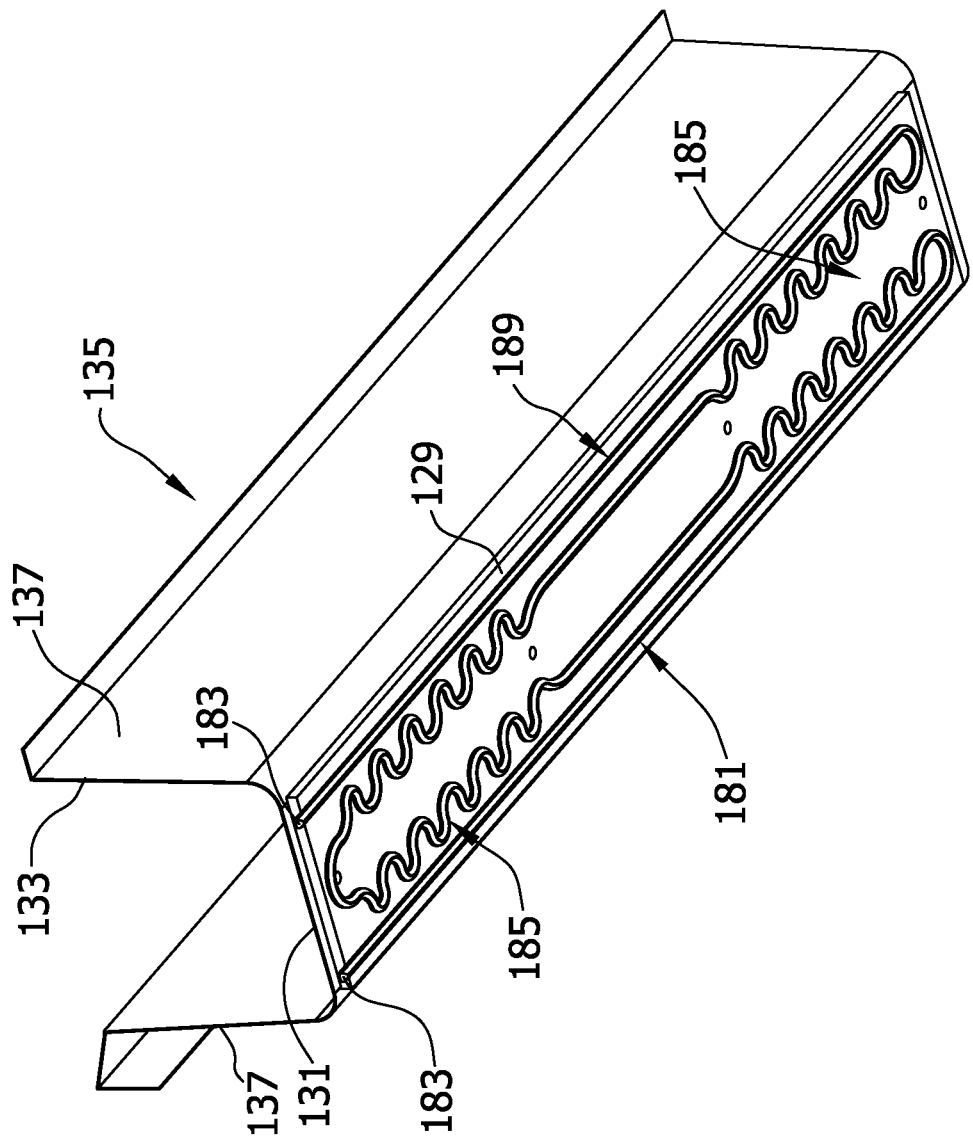
FIG. 9 is a detail bottom plan view of an alternative embodiment of a heating element removed from a food serving bar of the present invention.

FIG. 9 shows an alternative embodiment of a heating element 181 used to provide a variable amount of heat along the longitudinal length of the channel 135. The particular heating element 181 illustrated in FIG. 9 has been removed from the food serving bar 121 of FIGS. 5 and 6 and is sized for heating the bottom wall 131 of the heat conductive layer 133. The heating element 181 of FIG. 9 has two terminals 183 for connection to a power supply and two end sections, generally designated 185, configured to have a higher watt density than a middle section, generally designated 189, of the element. When current is passed through the heating element 181 of FIG. 9, three distinct heating zones are created each extending lengthwise of the channel 135. It is understood that a heating element similar to the element of FIGS. 1-4 in contact with both side walls 69 and the bottom wall 65 of the heat sink 29 could be arranged in a similar manner to create two or more distinct zones of heating. For example, the loops 85 of the heating element 45 could be spaced closer together to provide one or more zones of higher watt density for higher temperatures, or farther apart to create one or more zones of lower watt density for lower temperatures. Also, the heating element of any of the embodiments of the invention could have separate sections extending lengthwise of the channel having different or the same watt densities that are electrically connected in series to a single power supply, or each section could be controlled by its own power supply.

Figure 10:
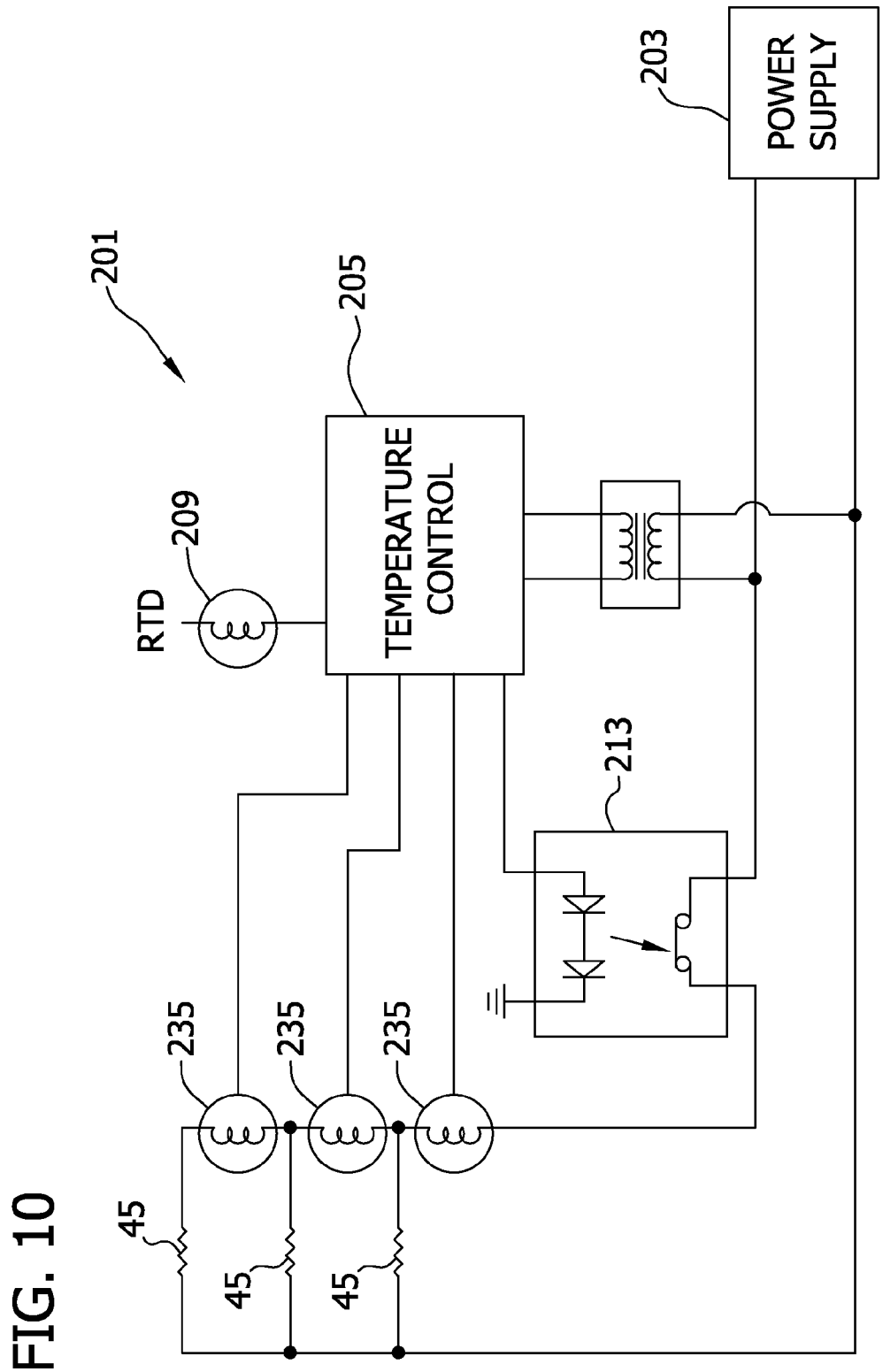
FIG. 10 is an electrical schematic of one embodiment of a temperature control system of the present invention.

FIG. 10 illustrates a schematic diagram of one embodiment of a temperature control system 201 for controlling the temperature of the food-holding pans 5 in a food serving bar 1 having at least three channels 9 and at least three heating elements 45 (one heating element per channel) electrically connected to a power supply 203. The temperature control system comprises a temperature controller 205 that receives a signal from a temperature sensor 209 in the food serving bar 1 and allows the operator to adjust the temperature of the food-holding pans 5 in the food serving bar. The temperature controller 205 may be used to either increase or decrease the amount of current that is supplied to the three heating elements 45 based on input received from the operator. Also, the control system 201 comprises a relay 213 that allows for on/off control of all the heating elements of the food serving bar simultaneously. In the embodiment of FIG. 10, the heating elements 45 are wired in parallel so that the temperature of all the channels 9 increases or decreases based on the temperature setting of the controller 205 and the amount of current delivered to the heating elements. It is understood that the heating elements 45 of each channel 9 may have a different electrical resistance so that the food-holding pans 5 in a respective channel may be held at a different temperature than the food-holding pans in the other channels. Further, the heating elements 45 may be configured with variable watt densities, e.g., as shown in FIG. 9, so that the temperature may vary along the length of each channel 9. The temperature control system 201 shown in FIG. 10 allows the temperature of all three channels 9 to be raised or lowered by adjusting a single temperature setting of the temperature controller 205. It is contemplated that the temperature sensor 209 may be located in the center channel 9 or the two outer channels. Also, each channel 9 may have a separate temperature sensor 209 so that the amount of current delivered to the food serving bar 1 is adjusted according to a maximum or minimum temperature setting in any of the three channels 9. Further, each channel 9 may have multiple temperature sensors 209 for providing multiple temperature settings for each channel.

Figure 11:
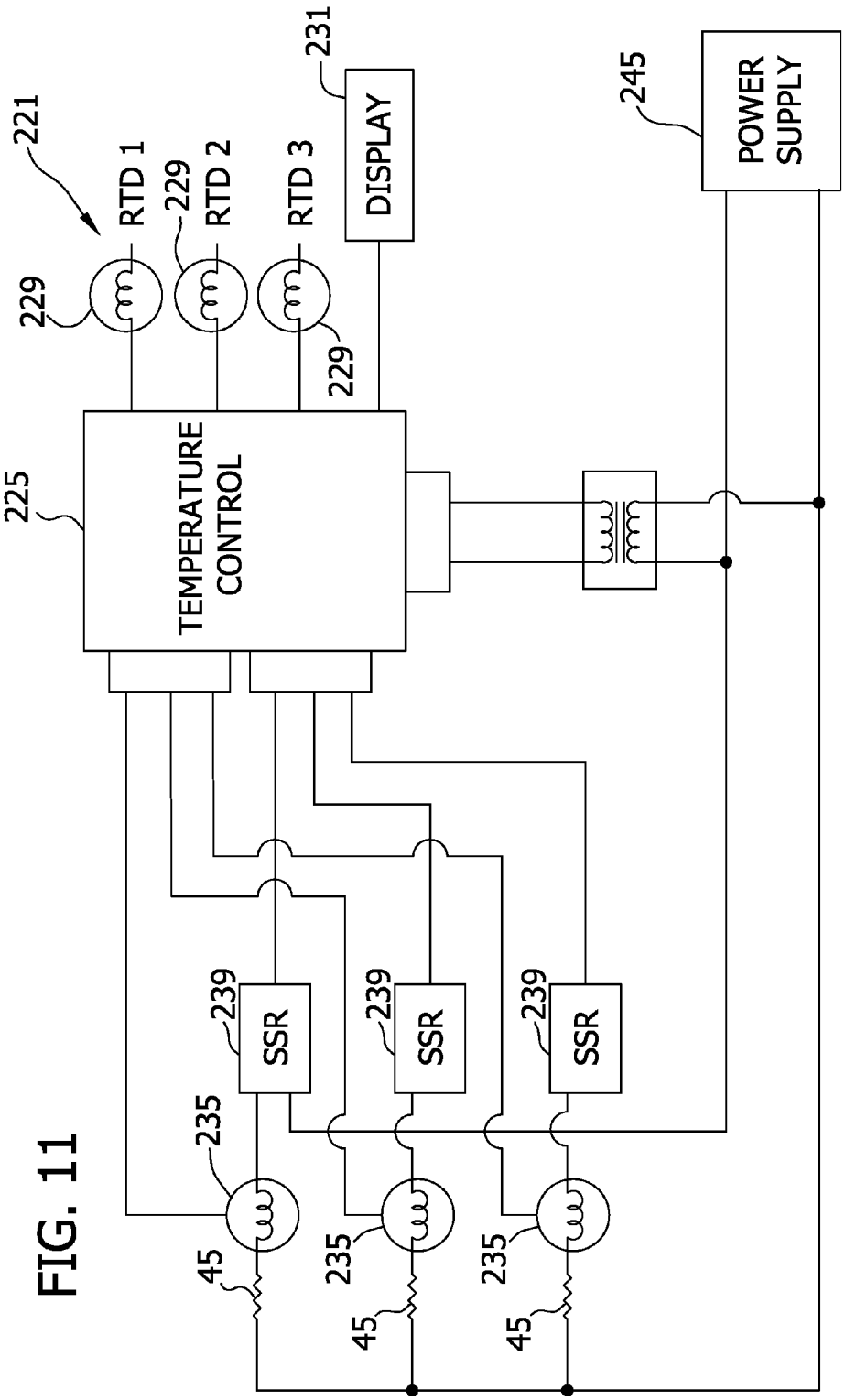
FIG. 11 is an electrical schematic of a second temperature control system of the present invention.

FIG. 11 shows an electrical schematic of a second temperature control system, generally indicated 221, wherein the temperature of each channel 9 of the food serving bar 1 may be adjusted independent of the temperature of the other channels. The temperature control system 221 of this embodiment comprises a temperature controller 225 that receives signals from separate temperature sensors 229 associated with respective channels 9 of the food serving bar 1 independently of the other channels. The controller 225 has an operator interface 231 (shown as "display" in FIG. 11) that allows the operator to monitor and adjust the temperature of each channel 9 of the food serving bar 1. The operator interface 231 may be a touch screen or other display providing temperature readouts of the channels 9 and allowing adjustments to the current supplied to each channel based on the temperature displayed to the operator. In this embodiment, each heating element 45 has a dedicated heating circuit with a dedicated current sensor 235 and on/off relay 239 allowing the current flowing through each heating element to be individually controlled by the temperature controller 225. In this way, the temperature of each channel 9 can be varied independently of the other two channels by adjusting the amount of current flowing from the power supply 245 to a respective heating element 45.

It is understood that each heating element 45 may be configured with variable watt densities, e.g., as shown in FIG. 9, so that the temperature along the length of each channel may vary. Further, the temperature control system of FIG. 11 could also be arranged such that one or more channels 9 may have multiple heating elements 45 that are each independently controllable with separate current sensors 235 and relays 239 to allow control of the temperature in discrete heating zones extending lengthwise of each channel. For example, the schematic diagram of the temperature control system 221 shown in FIG. 11 illustrates such an independently controllable temperature system for a single channel 9 in which the channel has three discrete heating zones extending lengthwise of the channel and each having a dedicated heating element 45 and current sensor 235. It is understood, that the temperature control system 221 could be configured to provide independent control of more or less than three heating zones without departing from the scope of this invention.

Figure 12:
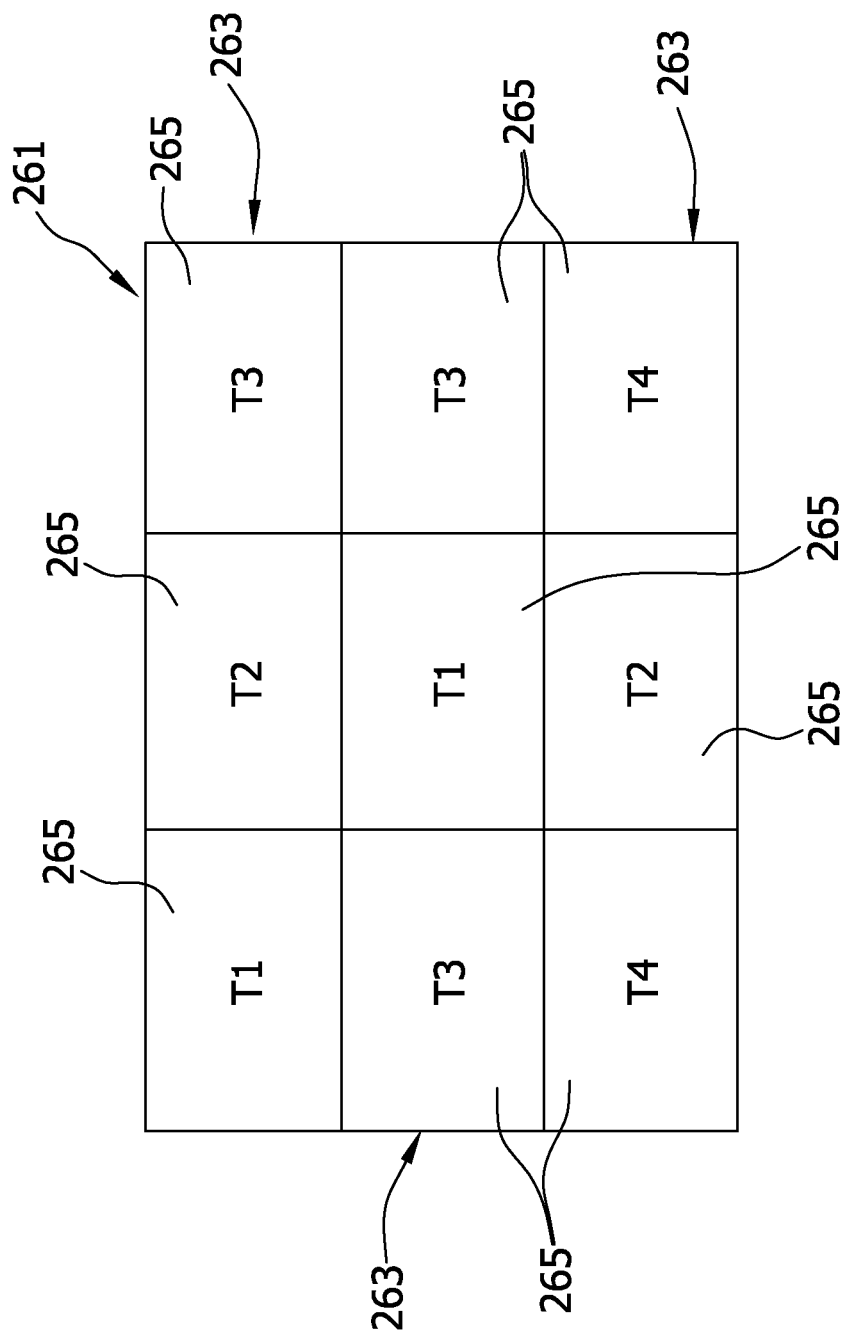
FIG. 12 is a schematic showing a temperature grid of the food serving bar of the present invention.

FIG. 12 illustrates a temperature grid, generally indicated 261, of the food serving bar 1 of the present invention that may be achieved by either of the temperature control systems 201, 221 described above. Each horizontal row 263 of the grid 261 represents a channel 9 of the food serving bar 1 that is segregated into three separate heating zones 265. Each heating zone may correspond to the location of a single food-holding pan 5 or multiple food-holding pans in the food serving bar 1. The heating element 45 of each channel 9 is configured to provide the separate heating zones 265 as discussed above. For example, the heating element 45 of the top channel 9 shown on the grid 261 has three distinct zones 265 with each of the zones having a different temperature setting (T1, T2, and T3). The middle channel 9 has a heating element 45 that provides the same temperature setting (T3) for the two end heating zones 265 and a different temperature setting (T1) for the middle zone 265. It is understood that heating zones 265 of each channel could have the same temperature setting or each temperature zone could have a different temperature setting without departing from the scope of this invention. Further, each heating zone 265 could include an independently controllable heating element 45 and temperature sensor to allow the temperature in each heating zone to be independently controlled. In one embodiment, the temperature settings of each of the channels 9 may range from approximately 150 degrees F. (66 degrees C.) to approximately 250 degrees F. (121 degrees C.). The holding time for food products held in the food-holding pans 5 of the food serving bar 1 is typically about 4 hours, but is understood that this holding time may vary depending on the type of food product (e.g., meat, cheese, beans, et.) held in the serving bar.

In one particular embodiment of the present invention, the food serving bar 1 has an overall length of approximately 39 inches (99 cm) and an overall width of approximately 21.5 inches (54.6 cm). The three channels 9 are sized so that each pan receiving cavity 11 has a width of approximately 6 inches (152 mm) to accommodate standard ⅓-size (6¹⁵⁄₁₆ in. by 12¾ in. (175 mm by 374 mm)) food storage pans, ⅙-size (6⅞ in. by 6¼ in. (175 mm by 159 mm)) pans, and ⅑-size (6⅞ in. by 4¼ in. (175 mm by 108 mm)) pans. It is understood that any combination of ⅓-size, ⅙-size, and ⅑-size food-holding pans can be used in the food serving bar 1 of the illustrated embodiment. In the embodiment of FIG. 1, each channel 9 of the food serving bar 1 holds two ⅓-size pans 5 at the ends of the channel and one ⅙-size pan 7 between the two end pans. It is understood that the food serving bar 1 may hold other combination of pan sizes (e.g., four ⅙-size pans and two ⅑-size pans) without departing from the scope of this invention. Also, it is contemplated that the channels 9 of the food serving bar 1 of the present invention may be sized to accommodate any other standard food-holding pan size (e.g., full-size pans) or non-standard food-holding pan size.

Figure 13:
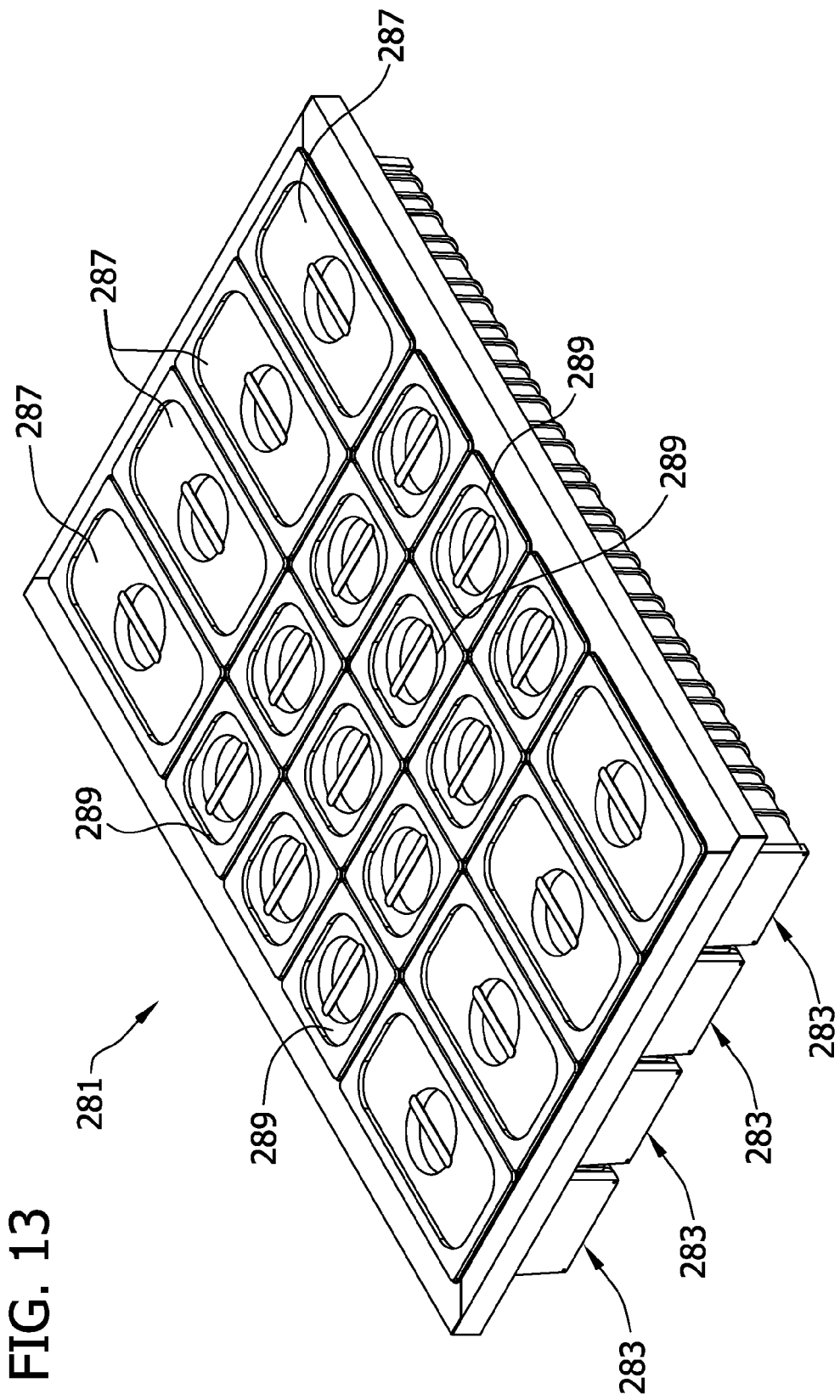
FIG. 13 is a perspective of a fourth embodiment of the food serving bar.

FIG. 13 shows an alternative embodiment of a food serving bar of the present invention, each generally designated 281, that has four channels, generally indicated 283, substantially similar to the channels 9 of the first embodiment. In the embodiment of FIG. 13, the food serving bar 281 has an increased length so that each channel 283 can accommodate two ⅓-size food-holding pans 287 and three ⅙-size food-holding pans 289. It will be understood that other combination of pans (e.g., four ⅙-size food-holding pans and six ⅓-size food-holding pans) may be received in the channels 283 of this embodiment without departing from the scope of this invention.

Figure 14:
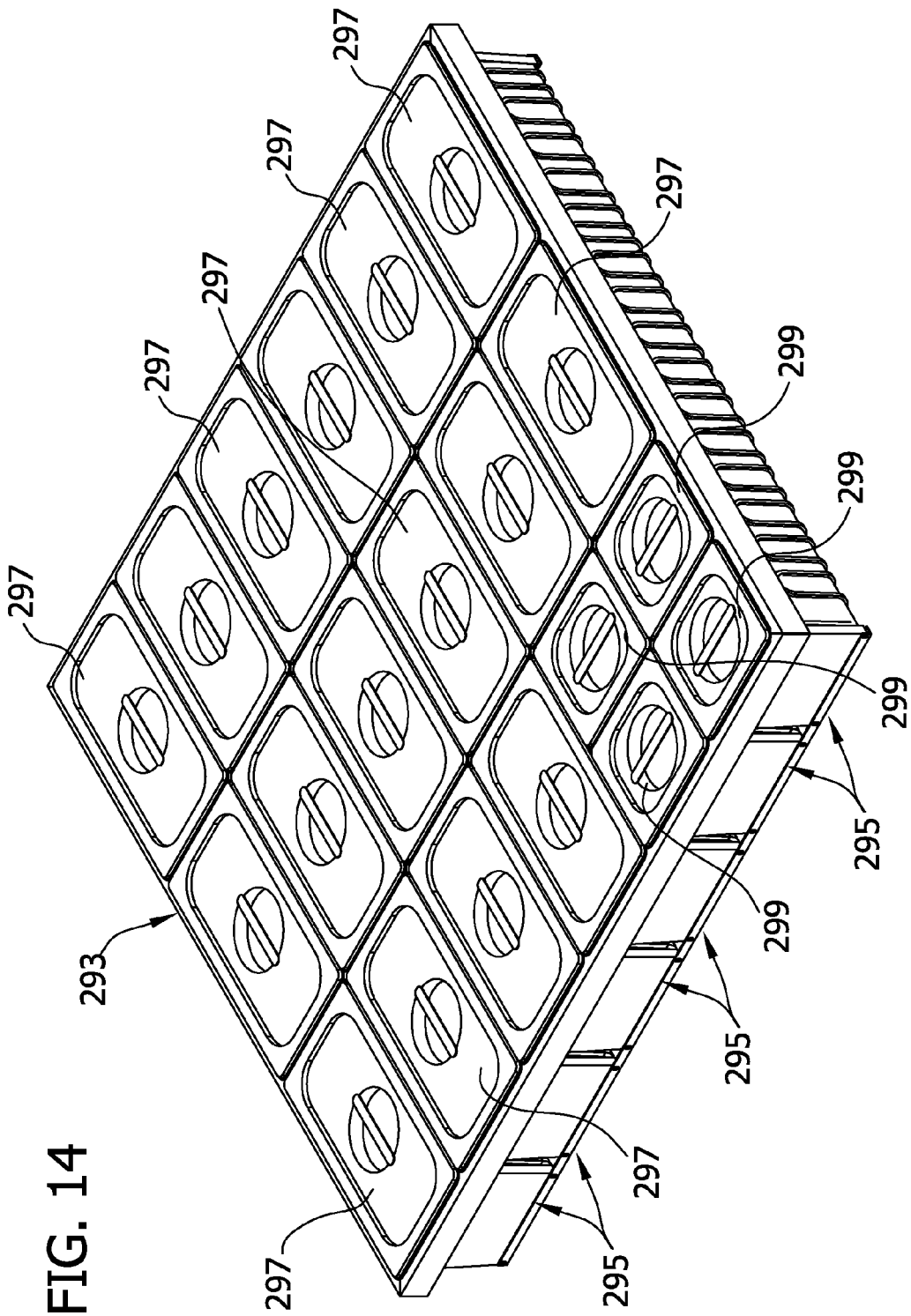
FIG. 14 is a perspective of a fifth embodiment of the food serving bar.

FIG. 14 shows an alternate embodiment of the food serving bar, generally indicated 293, similar to the previous embodiment but having six channels, each generally indicated 295 and each sized to receive three ⅓-size pans 297, or two ⅓-size pans and two ⅙-size pans 299. It will be understood that other combination of pans (e.g., six ⅙-size pans and nine ⅑-size pans) may be received in the channels 295 without departing from the scope of this invention.

The food serving bar of the present invention offers several advantages over existing food serving bar technology. These advantages include the ability to zone the holding temperature by using one or more heating elements having variable watt density, separate control zones, or segmented heating elements with different watt ratings; the elimination of the need to heat water to uniformly heat the food pans; the elimination or reduction in maintenance time/costs; and energy saving through more efficient heat transfer of direct conduction and the use of heat sinks. Also, the food serving bar of the present invention is more compact than a water bath food serving bar of the prior art with more vertical space being available under the present invention for storage.

It is understood that the food serving bar of the present invention could be supplied as a complete unit having a cabinet for supporting the food serving bar for installation in a restaurant, or the food serving bar could be supplied as a retrofit unit for installation on an existing food serving bar. For example, the food serving bar of the present invention could be supported in the water holding well of an existing steam table food serving bar that has been drained of water. The resulting retrofit serving bar would have all the advantages of the present invention including higher heating efficiencies and variable heating of the food-holding pans in the serving bar. It is understood that any of the embodiments described herein having the various temperature control features could be included as a retrofit of an existing food serving bar or as a complete unit.

Figure 15:
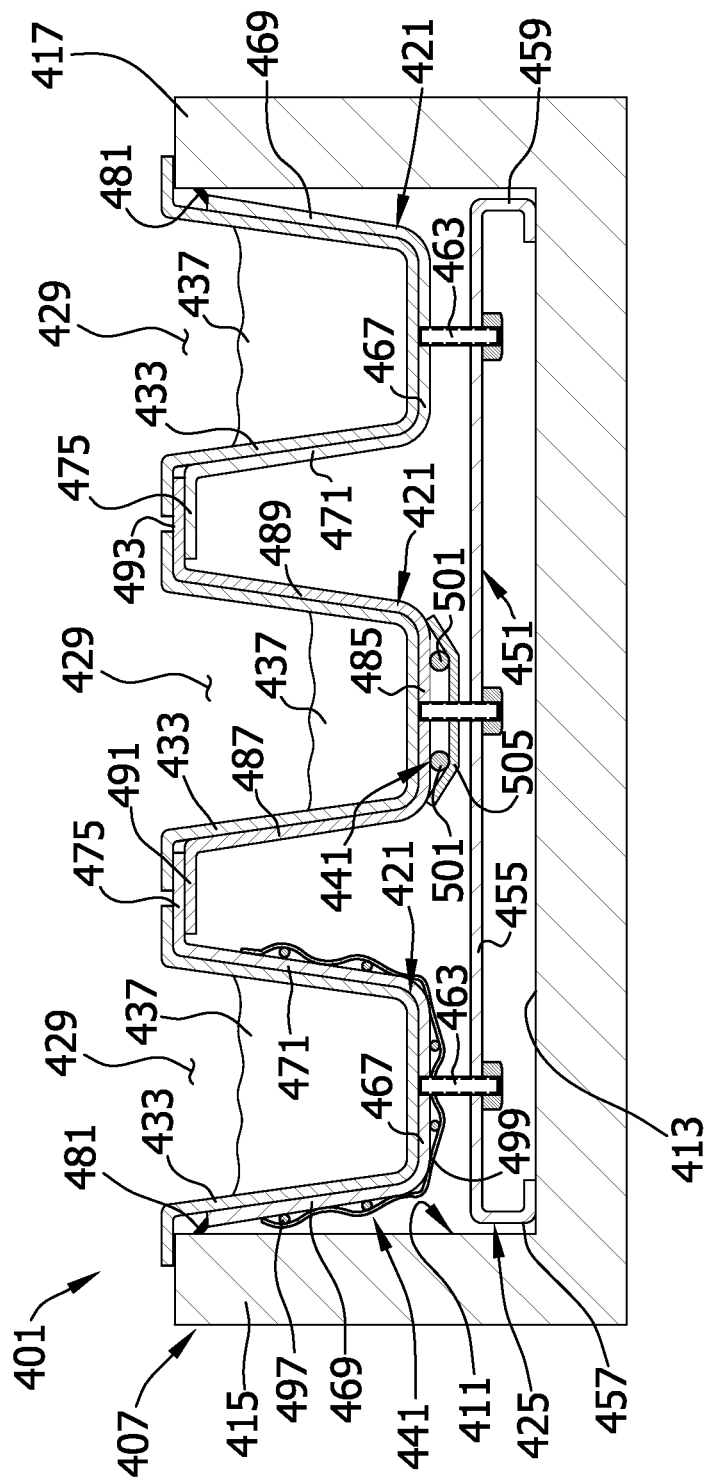
FIG. 15 is section view of a sixth embodiment of the food serving bar.

FIG. 15 shows an alternative embodiment of the food serving bar, generally designated 401, of this invention. In this embodiment, the food serving bar 401 comprises a cabinet 407, a well, generally designated 411, in the cabinet having a bottom surface 413, opposite side walls 415, 417, opposite ends (not shown), and a number (e.g., three) of heat conductive layers, generally designated 421, supported by a support system, generally designated 425, mounted on the bottom surface of the well. In the embodiment of FIG. 15, each of the heat conductive layers 421 is in the form of an upward-opening channel defining an elongate pan receiving cavity 429 extending lengthwise of the food serving bar 401 for placement of one or more food-holding pans 433 at any desired location along the cavity. The pan-receiving cavities 429 preferably extend parallel to one another. In the illustrated embodiment, each heat conductive layer 421 acts as a heat sink and can be formed as a single member extending substantially the full length of the well 411 or, alternatively, it can be formed as a series of shorter members placed end to end closely adjacent one another or abutting. The heat conductive layers 421 are in direct thermal contact with the food-holding pans 433 to heat food held in the pans, preferably by conductive heat transfer from the layers to the pans. As used herein, the term "direct thermal contact" means that an exterior surface of a pan 433 is either in surface-to-surface contact with the inner surface of a respective heat conductive layer (i.e., no spacing between the two surfaces or at least certain areas thereof) or positioned closely adjacent the inner surface of the heat conductive layer (i.e., the spacing is 0.5 in. or less). As a practical matter, some small spacing (0.5 in. or less) may be desirable to facilitate removal of a pan away from a respective heat conductive layer.

As with the previous embodiments, each heat conductive layer 421 may have a heating element, generally designated 441, connected to a temperature control system (not shown) for heating the layers to a common temperature or to selected different temperatures. Each heat conductive layer 421 distributes heat uniformly to the food-holding pan(s) 433 in direct thermal contact with the layer.

In the embodiment of FIG. 15, the support system 425 comprises an elongate downward-opening channel member 451 having a generally flat top wall 455 that supports the three heat conductive layers 421 and downwardly bent lateral side walls 457, 459 that contact the bottom surface 413 of the well 411. Each heat conductive layer 421 is attached to the channel member 451 by a support rod 463 that may be a threaded fastener (e.g., bolt) or other support member (e.g., stud, rivet, etc.). The support system 425 may have other configurations without departing from the scope of this invention.

As shown in FIG. 15, each of the two outer channel-shaped heat conductive layers 421 comprises a bottom wall 467, an outer side wall 469 adjacent a respective side wall 415, 417 of the well 411, and an inner side wall 471 having a longitudinal flange 475 in contact with the middle channel-shaped heat conductive layer. A seal 481 is provided between each of the outer side walls 469 of the two outer channels 421 and a respective side wall 415, 417 of the well 411 to prevent food 437 from falling into the spaces between the channels and well side walls. The middle heat conductive layer 421 has a bottom wall 485 and two opposed side walls 487, 489 each having a longitudinal flange 491, 493 at its upper end that contacts a corresponding flange 475 of the two outer heat conductive layers.

The heating elements 441 are in thermal conductive contact with the outer surfaces of the heat conductive layers 421 for heating the food holding pans 433 received in the pan receiving cavities 429. Each food-holding pan 433 received in a respective cavity 429 is supported by a respective heat conductive layer 421 and is preferably in direct thermal contact (as defined above) with the inner surface of the layer. As shown in FIG. 15, one of the outer heat conductive layers 421 (the left layer) has an electrical resistance heating element 497 held in contact with the heat conductive layer by a layer of metal foil 499 attached to the outer surface of the heat conductive layer by adhesive (not shown). In the illustrated embodiment, the middle heat conductive layer 421 is heated by a heating element 441 comprising one or more metal tube heaters 501 held against the bottom wall of the heat conductive layer by a bracket 505. Heat is distributed to the side walls 487, 489 of the middle heat conductive layer by conduction so that the side and bottom walls of the middle heat conductive layer supply heat to the one or more food-holding pans 433 received therein. The metal tube heaters 501 may carry thermal fluid (not shown) or may be any other type of heating element (e.g., a quartz tube heater) without departing from the scope of this invention. As with the previous embodiments, the heating elements 441 associated with the heat conductive layer may be part of a temperature control system that allows independent temperature control of adjacent rows of food-holding pans 433 or provides zones of heating having different temperature settings within the same row of food-holding pans that may be independently controlled.

Figure 16:
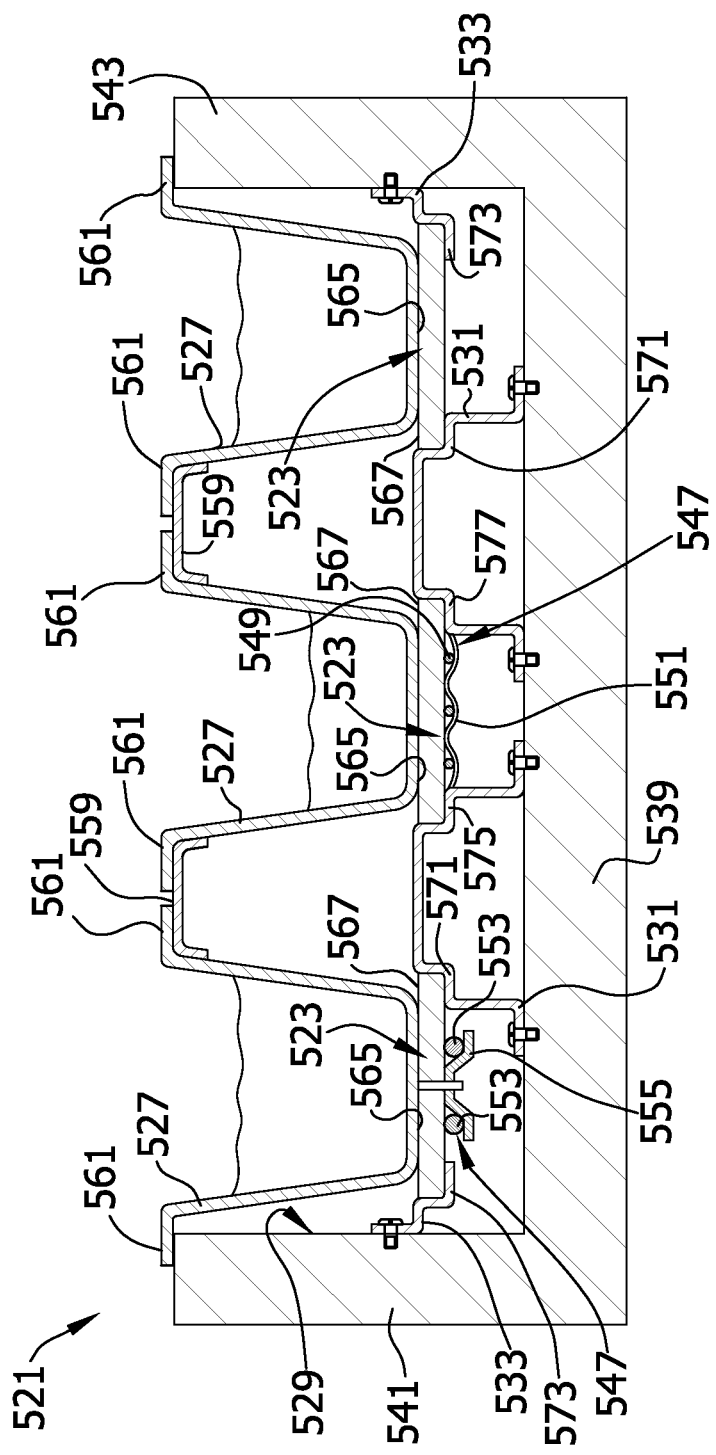
FIG. 16 is a section view of a seventh embodiment of the food serving bar.

FIG. 16 illustrates an alternative embodiment of the food serving bar, generally designated 521, similar to the embodiment of FIG. 15. In the embodiment of FIG. 16, the food serving bar 521 comprises a number (e.g., three) of heat conductive layers, generally designated 523, in the form of elongate generally parallel heat sink plates extending lengthwise of the well 527 for supporting food-holding pans 527 in the well of the food serving bar 521. The heat sink plates 523 are mounted in the well 529 by brackets 531, 533 attached to the bottom wall 539 and/or side walls 541, 543 of the well 527. As with the previous embodiment, the heat sinks 523 are heated by heating elements, generally designated 547, that may be electric resistance heating elements 549 attached to the outer surfaces of the heat sinks 523 by metal foil, and/or metal tube heaters 553 attached to the outer (lower) surfaces of the heat sinks by brackets 555, and/or any other type of heating elements. The food serving bar 521 further comprises two pan support dividers 559 (e.g., divider bars) attached to the longitudinal end walls (not shown) of the well 529 for positioning the food holding pans 527 in the well. In the embodiment of FIG. 16, the lips 561 of the food-holding pans 527 are supported by the side walls 541, 543 of the well 529 and by the pan support dividers 559. The bottom surfaces 565 of the food-holding pans 527 are in direct thermal contact (as previously defined) and preferably in heat conductive contact with the top surfaces 567 of respective heat sink plates 523 so that each food holding pan is heated by conductive heat transferred from a respective heat sink.

In the embodiment of FIG. 16, the two outer heat sink plates 523 are supported in the well 529 of the food serving bar by a support system comprising two inner support brackets 531 attached to the bottom wall 539 of the well and two outer support brackets 533 attached to respective side walls 541, 543 of the well. The inner and outer support brackets 531, 533 have cooperating shoulders 571, 573 that engage the outer heat sink plates 523. The middle heat sink plate 523 is supported by the two inner support brackets 531 that have cooperating shoulders 575, 577 that engage the middle heat sink plate. The heat sink plates 523 may be supported in the well 529 by other means.

Figure 17:
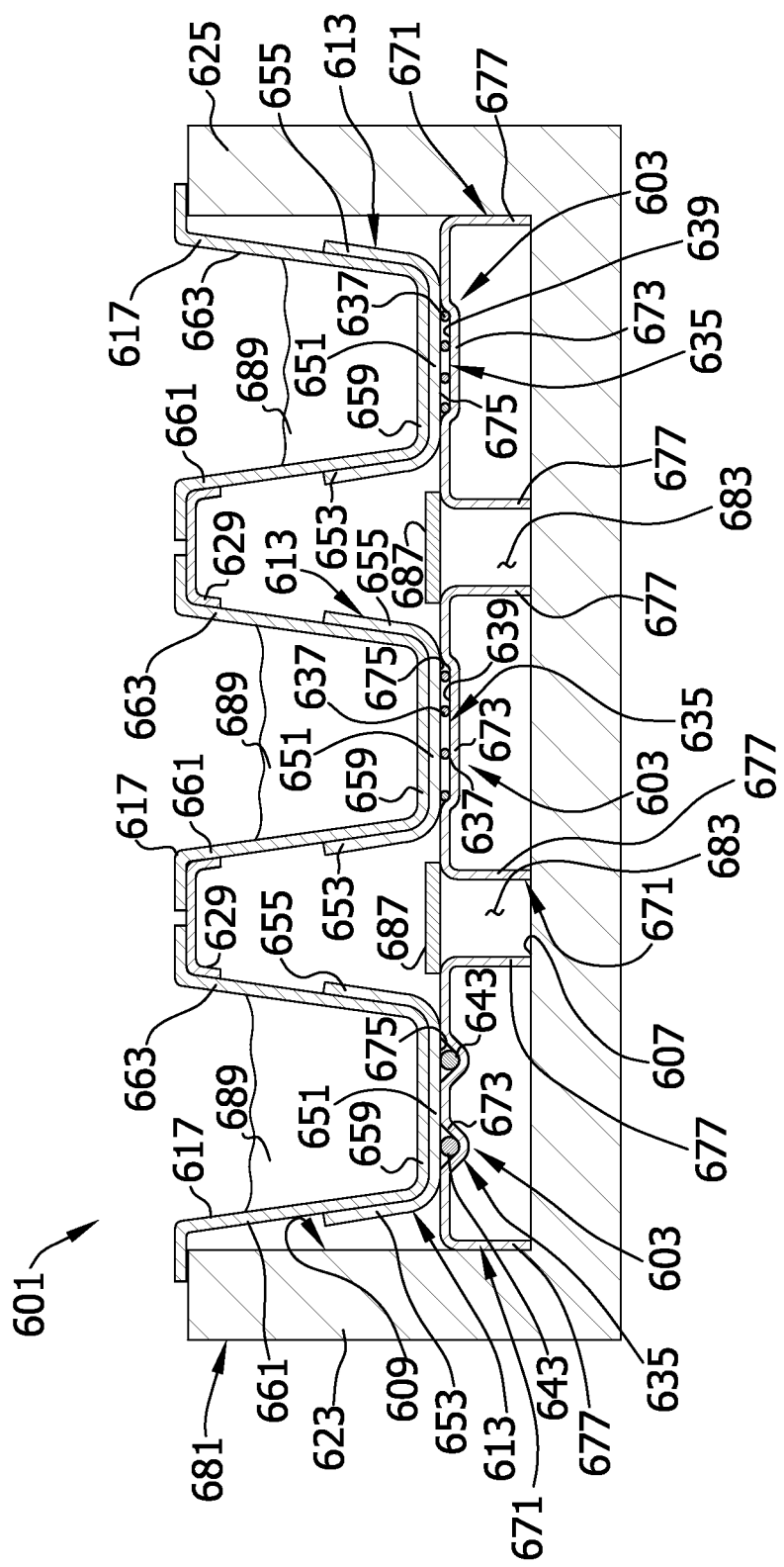
FIG. 17 is a section view of an eight embodiment of the food serving bar.

FIG. 17 illustrates an alternative embodiment similar to the embodiments of FIGS. 15 and 16 but having removable heat sink modules 603 supported on the bottom surface 607 of the well 609 of the food serving bar, generally designated 601. As with the embodiments of FIGS. 15 and 16, the food serving bar 601 of FIG. 17 has a number (e.g., three) of heat conductive layers generally designated 613 that allow conductive heat transfer directly from the layers to the food-holding pans 617 in the food serving bar. As shown in FIG. 17, the heat conductive layers 613 comprise elongate upward-opening channels that are sized and shaped to receive the food-holding pans 617. As with the previous embodiment, the food-holding pans 617 are supported by the side walls 623, 625 of the well 609 and by pan support dividers 629 (e.g., divider bars) attached to the longitudinal end walls (not shown) of the well. Also, the heat conductive layers 613 are heated by heating elements, generally designated 635, that may be electric resistance heating elements 637 attached to the outer surfaces of the layer by metal foil 639, and/or metal tube heaters 643 attached to the outer surface of the heat sinks by brackets, and/or any other type of heating elements.

In the embodiment of FIG. 17, the heat conductive layers are formed as channels that have a bottom wall 651 and two side walls 653, 655 in direct thermal contact (as defined above) with the respective bottom wall 659 and side walls 661, 663 of a food-holding pan 617. It is understood that one or more of the heat conductive layers 613 of this embodiment 601 may also be a heat sink plate in contact with only the bottom wall of the food holding pan without departing from the scope of this invention.

As shown in FIG. 17, each heat conductive layer 613 is supported in the well 609 by a support system comprising a plurality of supports 671 in contact with the bottom surface 607 of the well 609. As illustrated, each support, generally designated 671, is of inverted-channel shape, having a top wall 673 that contacts the outer (lower) surface 675 of the heat conductive layer 613 and two side walls 677 that contact the bottom surface 607 of the well 609. In the illustrated embodiment, the top wall 673 of the support 671 also supports the heating elements 635, 643 that may be similar to the heating elements described above. The supports 671, heating elements 635, and heat conductive layers 613 form removable heat sink modules 603 that may be placed into and removed from the well 609 of the cabinet 681.

Referring again to FIG. 17, the gaps 683 between adjacent supports 671 are bridged by filler plates 687 in contact with the top walls 673 of the supports. The filler plates 687 prevent food 689 from spilling into the spaces 683 between the supports. The filler plates 687 may be affixed (e.g., welded) to the supports 671 to form a rigid assembly that is removable as a unit from the well 609. It is understood that the filler plates 687 may be omitted from the food serving bar 601 or may be free of attachment to the supports to allow the supports to be independently placed into or removed from the well without departing from the scope of this invention.

FIGS. 18-22 show another embodiment of a food serving bar of this invention, generally designated 701. In this embodiment, the food serving bar comprises a cabinet 703 and a number of channels, each generally indicated at 705, extending lengthwise of the cabinet (three channels are shown but this number may vary, e.g., one, two, or four or more channels). The channels 705 may be fabricated from extruded metal and/or bent metal or other suitable material. Each channel 705 defines an elongate pan-receiving cavity 711 extending lengthwise of the food serving bar for placement of multiple food-holding pans at any desired location along the cavity. One such pan 715 is shown in phantom in FIG. 20. The size (length, width, depth and/or volume) of the pans may vary, as described above. By way of example but not limitation, the pans may be ⅓ size (volume) pans having one-third the width of a full size pan.

In the embodiment of FIGS. 18-22, the length of each channel 705 is divided into a plurality of independently controlled temperature zones, the first channel having two such zones Z1 and Z2; the second channel having three such zones Z3, Z4 and Z5; and the third channel having three such zones Z6, Z7 and Z8. The number of channels 705 can vary, e.g., one, two, three or more. Further, the number of zones per channel can also vary, e.g., one, two, three or more.

Figure 18:
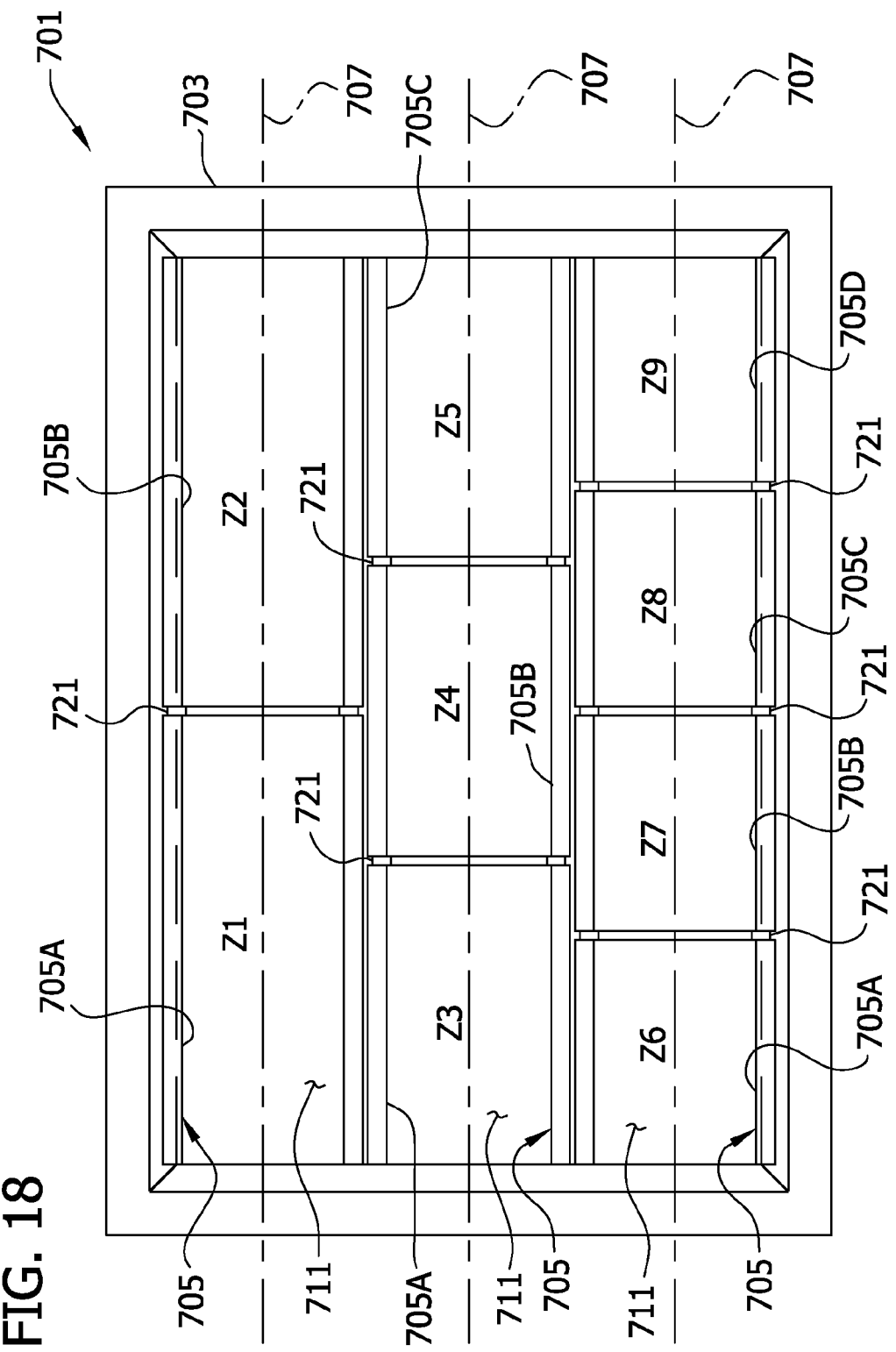
FIG. 18 is a plan view of an eighth embodiment of the food serving bar comprising one or more channels with thermal breaks between adjacent sections of the channels.
Figure 19:
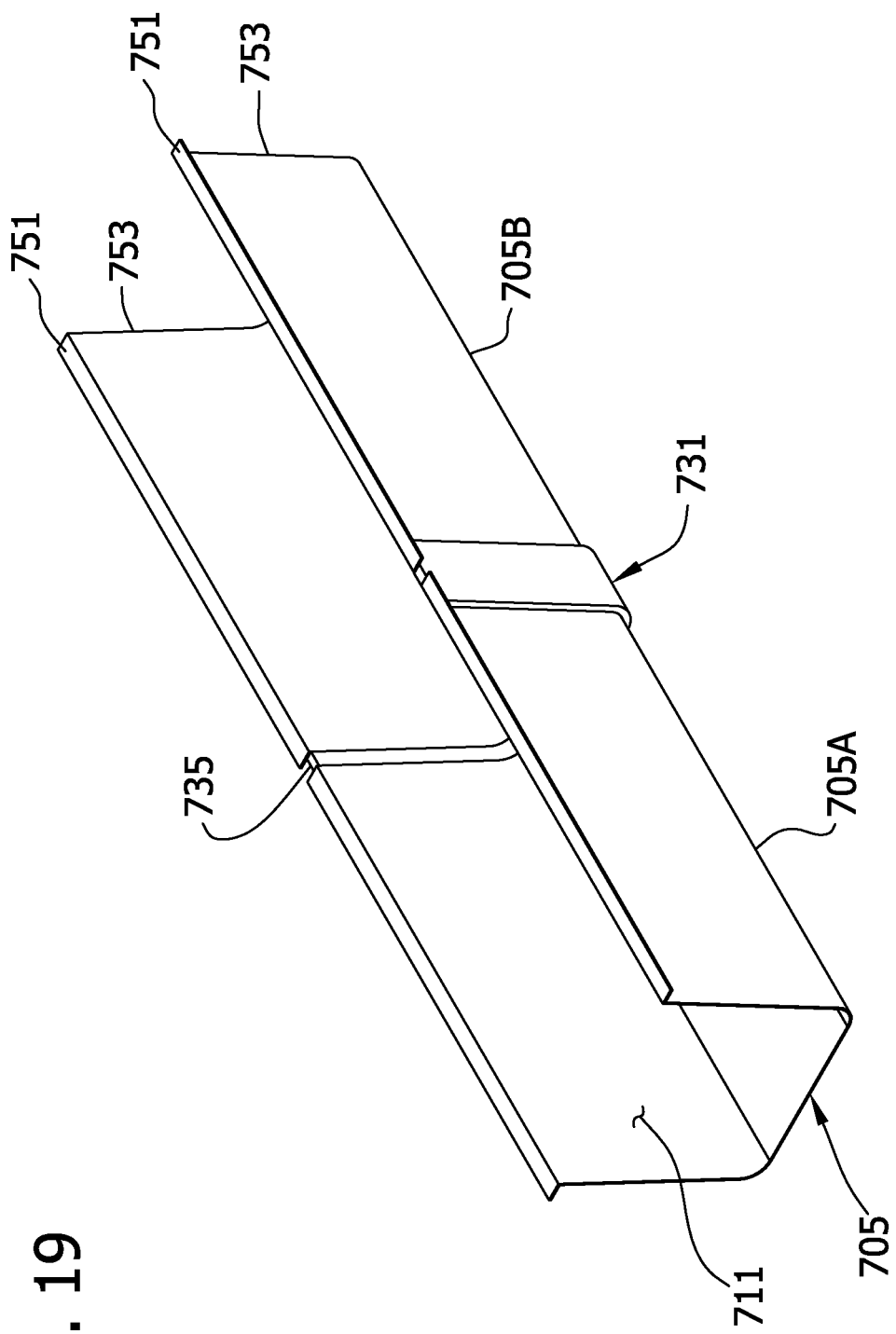
FIG. 19 is a perspective view of a channel comprising thermally separate channel sections and spacers for thermally spacing the channel sections.
Figure 20:
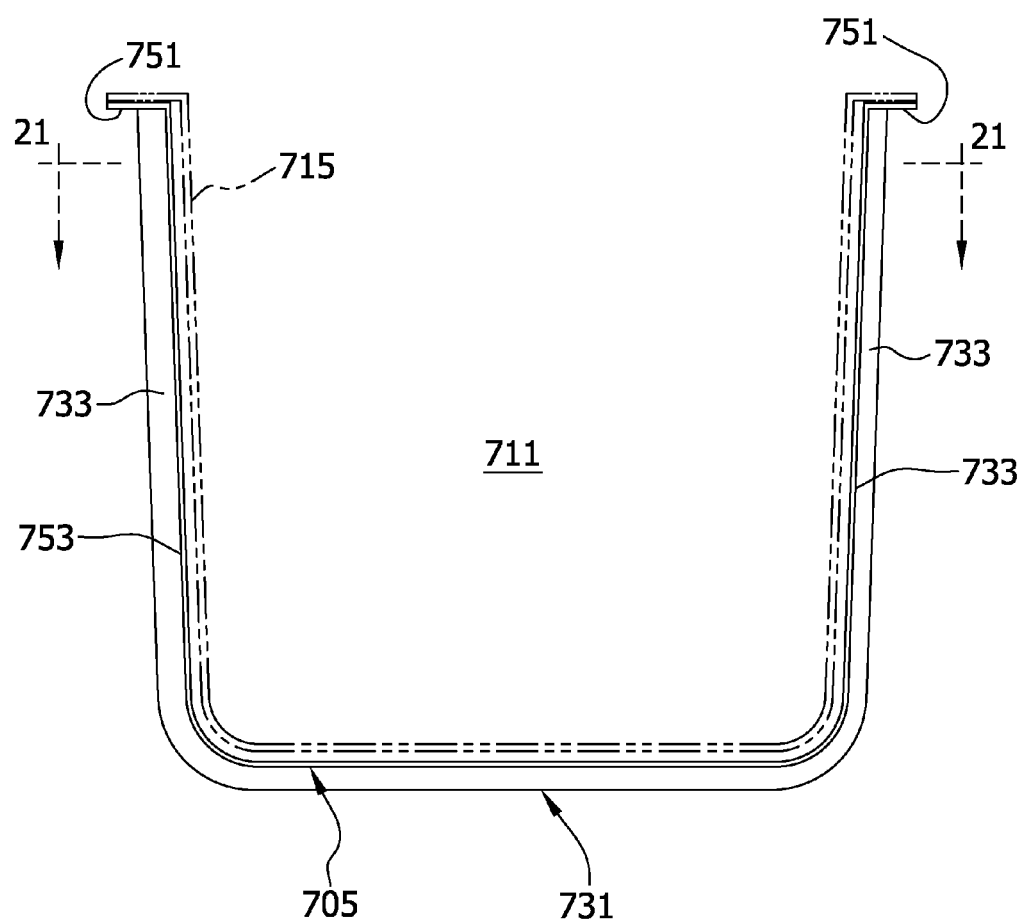
FIG. 20 is an end elevation of the channel of FIG. 19 and of a pan (shown in phantom lines) received in a cavity defined by the channel.
Figure 21:
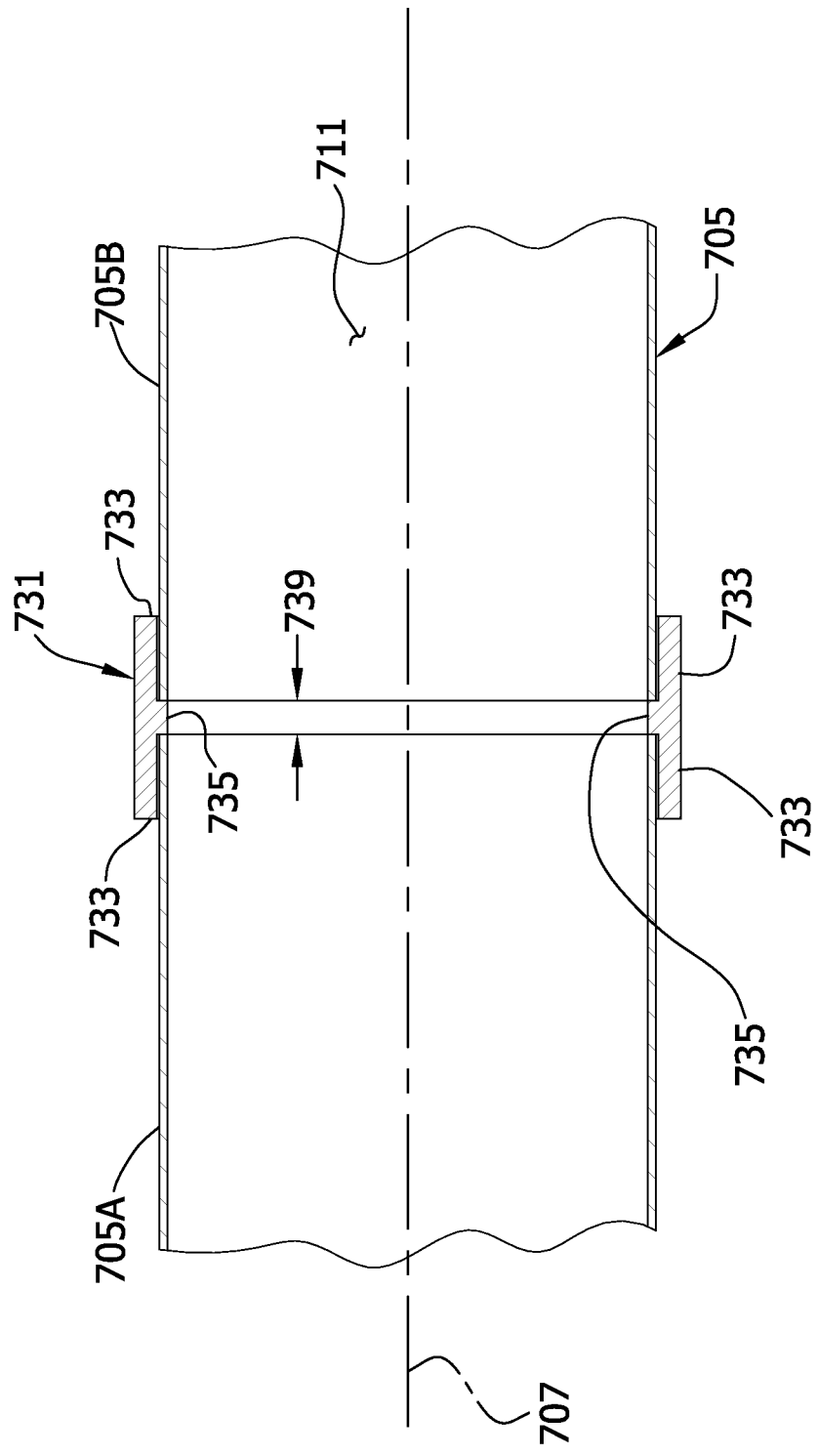
FIG. 21 is a section in the plane of lines 21-21 of FIG. 20.
Figure 22:
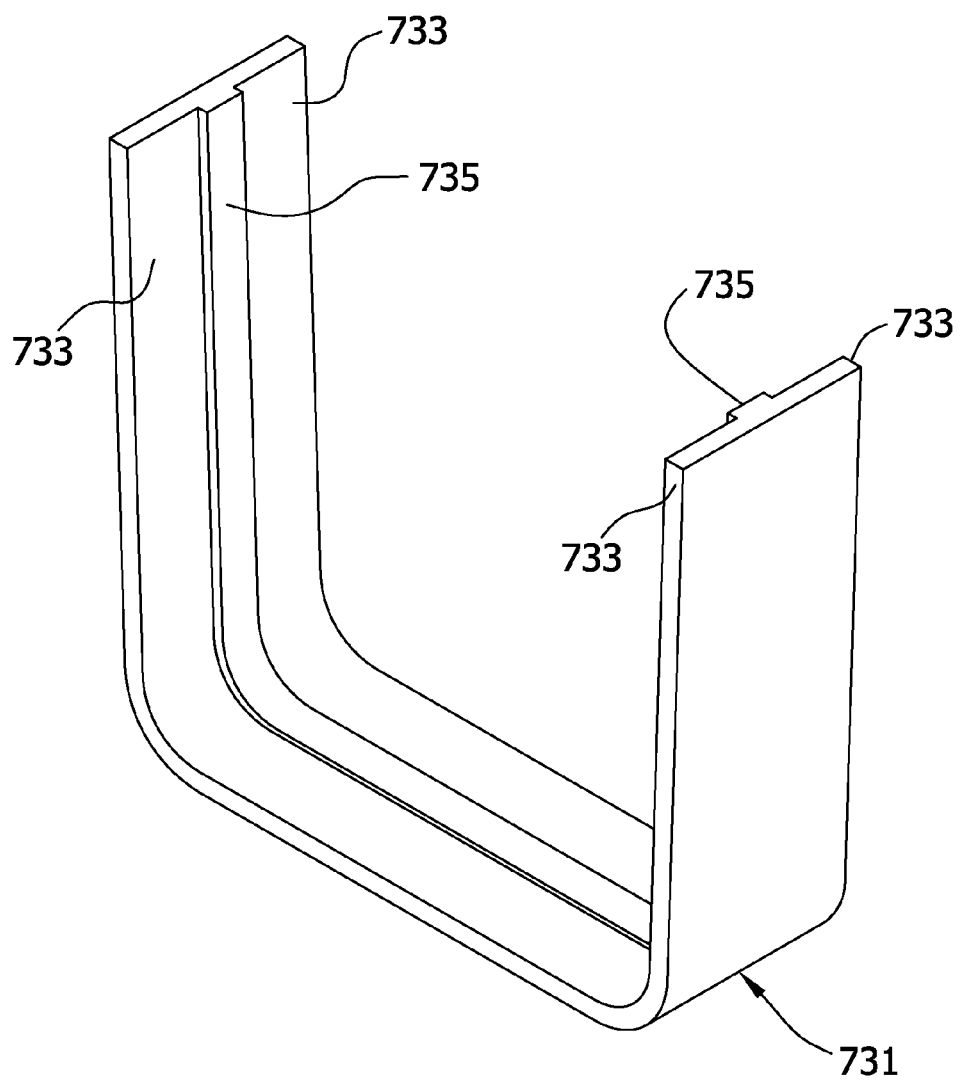
FIG. 22 is an enlarged perspective of one embodiment of a spacer used as a thermal barrier.

Each channel 705 has a longitudinal axis 707 and comprises a plurality of thermally separate channel sections extending lengthwise of the channel along this axis (e.g., in FIG. 18, sections 705A, 705B, 705C for a channel having three sections). As shown in FIG. 19, each channel section of the plurality of channel sections has an open top and an open end, and the channel sections are disposed along the axis 707 in open end-to-open end relation with respect to one another. Each channel section corresponds to one temperature controlled zone. The channel sections are separated by one or more thermal barriers 721 for maintaining adjacent channel sections thermally separate from one another. As a result, the temperature to which each channel section 705A, 705B, etc. is heated will not substantially affect the temperature of an adjacent channel section or sections. The thermal barrier or barriers 721 in a channel 705 may take different forms. By way of example, adjacent channel sections 705A, 705B may be supported such that they are separated by a simple air gap (constituting a thermal barrier) with no intervening structure and no heat transfer path between the sections. In this case, the air gap should be of sufficient width (e.g., 0.015-2.00 in.) to prevent conductive transfer of heat between the channels. Alternatively, the thermal barrier 721 may comprise a spacer, generally designated 731, of thermal insulating material between adjacent ends of adjacent channel sections 705A, 705B to maintain the ends spaced apart. An exemplary spacer 731 is shown in FIGS. 19-21. As illustrated, the spacer 731 comprises a channel-shaped member, also designated 731, of thermal insulating material (e.g., plastic) having opposite first and second end regions 733 configured to overlap (e.g., a telescoping fit) with respective adjacent ends of two channel sections 705A, 705B, and an insulating structure 735 (e.g., one or more ribs on the inner surface of the channel-shaped member 731) between the end regions for maintaining adjacent ends of the channels sections spaced apart by a distance no less than the corresponding horizontal dimension 739 of the insulating structure (see FIG. 21). The presence of this insulating structure 735 between the ends of the channel sections 705A, 705B provides an effective thermal barrier against the transfer of heat from one channel section to the other. The spacer 731 can be fabricated (e.g., molded) as one integral piece of material or as separate parts which function to space the ends of two adjacent channel sections from one another.

Figure 23:
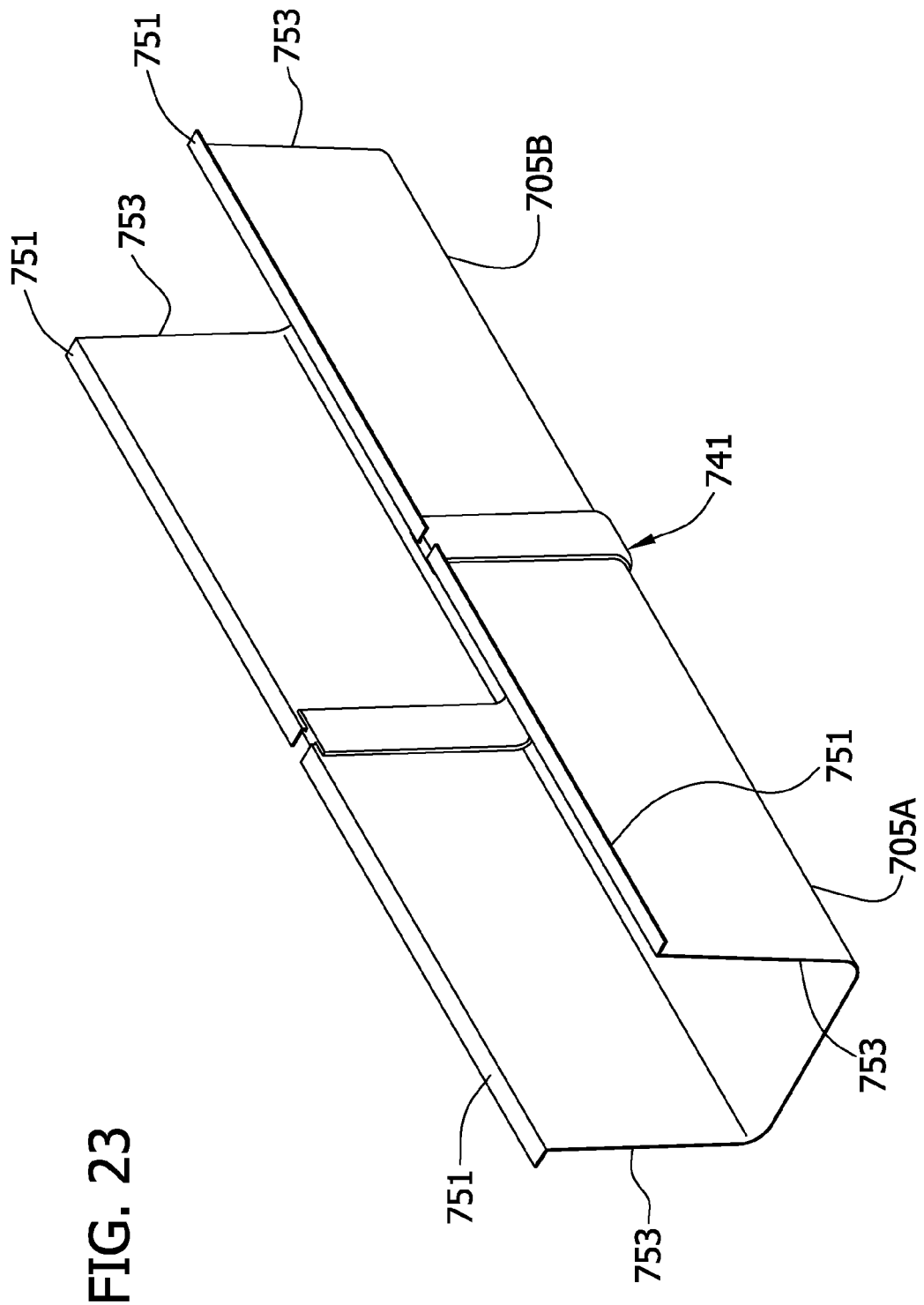
FIG. 23 is a perspective view similar to FIG. 19 but showing a thermal barrier of a different exemplary configuration.
Figure 24:
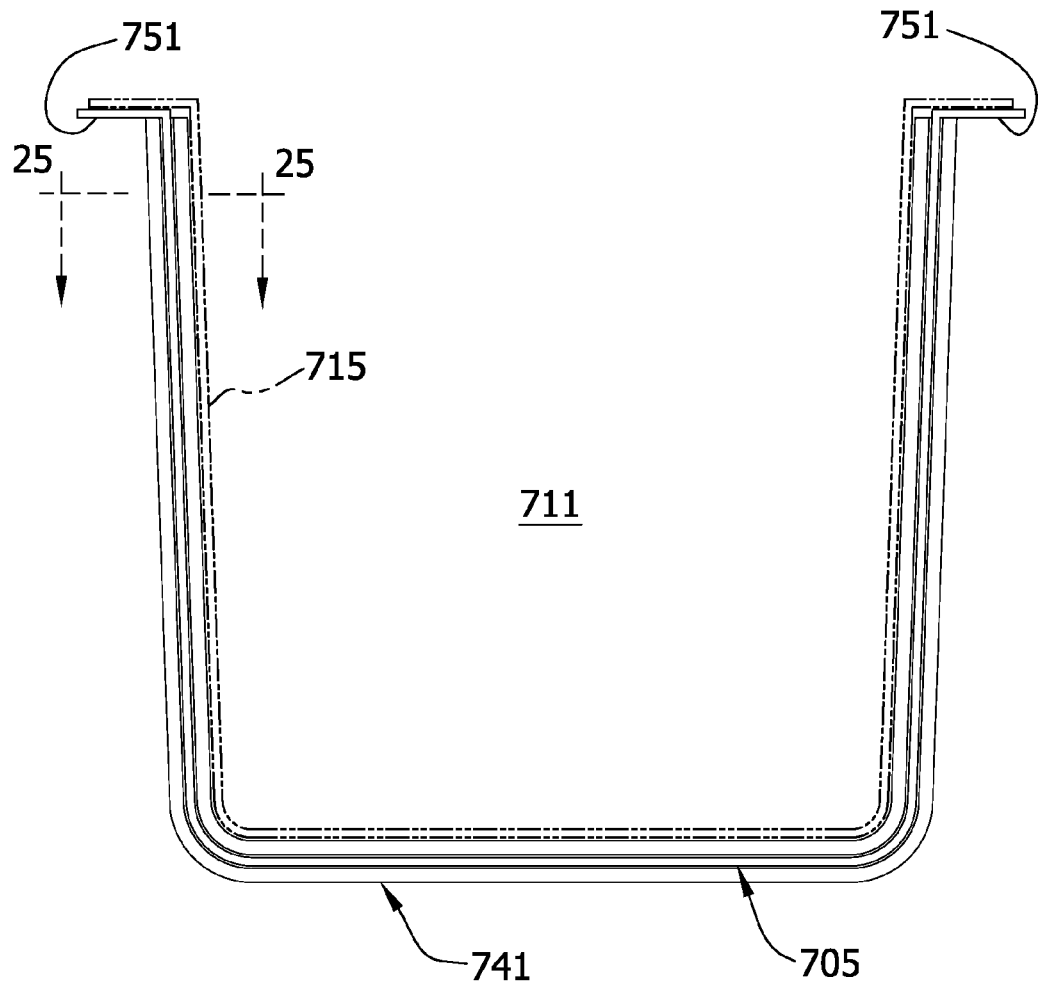
FIG. 24 is an end elevation of the channel of FIG. 23 and of a pan (shown in phantom lines) received in a cavity defined by the channel.
Figure 25:
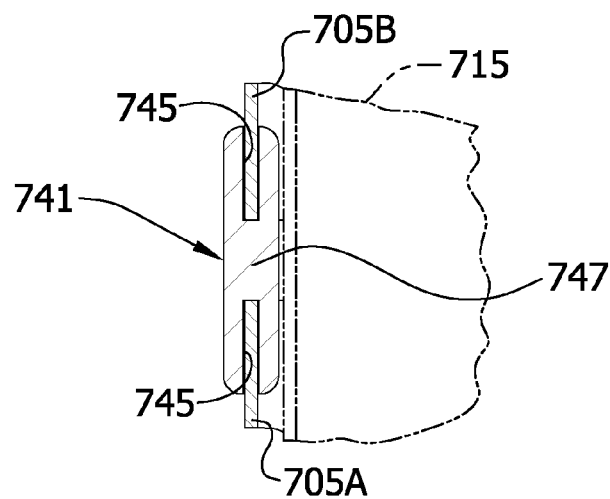
FIG. 25 is an enlarged section in the plane of lines 25-25 of FIG. 24.

FIGS. 23-25 show a thermal barrier in the form of a spacer 741 comprising a channel-shaped member, also designated 741, of insulating material. Each vertical leg of the channel-shaped member 741 has a horizontal cross-section of generally I-shape or H-shape (see FIG. 25) defining a pair of opposing slots 745 extending in from opposite ends of the spacer for receiving respective ends of adjacent channel sections 705A, 705B. The ends of the channel sections 705A, 705B are maintained thermally separate by the web 747 of the member 741. Other spacer shapes are possible. The spacer can be fabricated (e.g., molded) as one integral piece of material or as separate parts which function to space the ends of two adjacent channel sections from one another.

In some embodiments, the thermal barriers between adjacent channel sections have one or more functions in addition to maintaining adjacent channel sections thermally separate from one another. By way of example, the spacers 731, 741 described above also function as splices to connect the channel sections and hold them in alignment. In particular, the spacer 731 (FIGS. 19-22) is configured to have a channel shape generally matching the shape of two channel sections. The spacer 731 is sized such that adjacent ends of the channel sections have a snug, friction fit inside respective opposite ends of the spacer. In this position, the insulating structure 735 is positioned between the ends of the channel sections to keep them thermally separate, and the ends of the channel sections are held in alignment by the spacer to form a substantially continuous channel. Similarly, the spacer 741 (FIGS. 23-25) is configured to have a channel shape generally matching the shape of two channel sections. The spacer 741 is sized such that adjacent ends of two channel sections have a snug, friction fit inside slots 745 in respective opposite ends of the spacer. In this position, the web 747 of the spacer 741 is positioned between the ends of the channel sections to keep them thermally separate, and the ends of the channel sections are held in alignment by the spacer to form a substantially continuous channel. Thermal barriers of this invention may have other configurations effective to carry out the two functions described above.

Regardless of the specific type or configuration of thermal barrier 721 used (e.g., an air gap or spacer such as 731 or 741), it is desirable that the thermal barrier not substantially interfere with the smooth sliding of a pan or pans 715 along the channel or channels 705. In the embodiments of FIGS. 18-25, the pans 715 are supported in their respective pan-receiving cavities 711 by flanges 751 at the upper ends of the channel side walls 753. To minimize interference with sliding movement of the pans, the gaps between the flanges 751 of adjacent channel sections can be filled in some manner. By way of example but not limitation, the spacers 721, 731 may have bridging portions (not shown) configured to bridge the gaps between such flanges. Alternatively, if there is no such bridging structure, the gaps between the flanges should be kept small (e.g., less than about 0.06 in.) so that the pan-supporting surface is at least substantially continuous and substantially uninterrupted along a full length of each channel defining a pan-receiving cavity.

The thermal barriers 721 provide sharply defined and discrete temperature zones along the length of each channel 705 for holding the food in different pans 715 at different and well-defined temperatures. The zones can be heated to different temperatures in the manner described above, e.g., by using an independent heating circuit for each zone to enable independent temperature control for each zone. An exemplary circuit can be of the type shown in FIG. 11, with each heating circuit comprising a temperature sensor (e.g., RTD sensor 229), one relay (e.g., solid-state relay 239), one current sensor (e.g., sensor 235), and one heating element (e.g., electrical resistance element 45). The resistance elements 45 may have different resistances, as needed. Alternatively, a variable watt density heating element can be used to heat more than one zone on a channel to different temperatures.

It is understood that the food serving bar of the present invention could be supplied as a complete unit having a cabinet for installation in a restaurant, or the food serving bar could be supplied as a retrofit unit for retrofitting an existing food serving bar. For example, the food serving bar of the present invention could be fitted in the water-holding well of an existing steam table that has been drained of water. The resulting retrofit serving bar would have all the advantages of the present invention including higher heating efficiencies and variable heating of the food-holding pans in the serving bar. It is understood that any of the embodiments described herein having the various temperature control features could be installed either as original equipment, complete with cabinet, or used to retrofit existing food serving equipment.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A temperature controlled food serving bar for serving food for human consumption, said food serving bar comprising
at least one channel of thermally conductive material extending lengthwise of the food serving bar for receiving at least one food-holding pan, said at least one channel defining an elongate pan-receiving cavity extending lengthwise of the food serving bar for placement of said at least one food-holding pan in the cavity,
said at least one channel comprising a plurality of thermally separate channel sections, each channel section having an open top and an open end, said plurality of channel sections being disposed in open end-to-open end relation with respect to one another,
said channel sections comprising a plurality of temperature zones along a length of the channel, each temperature zone of the plurality of temperature zones having a different temperature,
one or more thermal barriers between adjacent open ends of adjacent channel sections, said one or more thermal barriers thermally separating adjacent temperature zones of said plurality of temperature zones, and
a temperature control system controlling one or more heating elements for heating said plurality of thermally separate channel sections to different temperatures,
wherein said food products in said plurality of different temperature zones are capable of being held at different food holding temperatures.

2. The temperature controlled food serving bar of claim 1 wherein each of said one or more thermal barriers comprises a spacer of thermal insulating material, said spacer being positioned between two of said adjacent open ends and spacing said adjacent open ends apart.

3. The temperature controlled food serving bar of claim 2 wherein said spacer comprises a channel-shaped member having a opposite first and second end regions configured to overlap with respective adjacent open ends of two channel sections of said plurality of channel sections, and a structure between said end regions for maintaining said adjacent ends of the channels sections spaced from one another.

4. The temperature controlled food serving bar of claim 2 wherein said spacer is configured as a splice for connecting two adjacent channel sections to one another.

5. The temperature controlled food serving bar of claim 1 wherein said temperature control system comprises a separate heating element for heating each channel section of said plurality of channel sections whereby the temperature of each channel section can be independently controlled to provide a separate temperature zone.

6. The temperature controlled food serving bar of claim 1 wherein each channel section of said plurality of channel sections is an extruded metal channel section.

7. The temperature controlled food serving bar of claim 1, further comprising a flat upwardly-facing pan-supporting surface extending substantially continuously and substantially uninterruptedly along a full length of said pan-receiving cavity whereby one or more pans can be slidably moved along the surface in a smooth and substantially uninterrupted manner to a selected position along said cavity.

8. The temperature controlled food serving bar of claim 7 wherein said pan-supporting surface is on said at least one channel.

9. The temperature controlled food serving bar of claim 1 wherein said temperature control system provides a variable amount of heat to said different temperature zones.

10. The temperature controlled food serving bar of claim 1 wherein said temperature control system comprises at least one heating element having a variable watt density to heat the food products in different temperature zones to different food holding temperatures.

11. The temperature controlled food serving bar of claim 1 wherein said at least one channel comprises three channels and wherein said temperature control system comprises at least three heating elements each of which is configured for heating one of the three channels but not the other channels.

12. The temperature controlled food serving bar of claim 11 wherein the at least three heating elements have different electrical resistances so that the food holding pans in respective channels may be held at different food holding temperatures.

13. The temperature controlled food serving bar of claim 11 wherein said temperature control system has an operator interface that allows the food holding temperatures of the at least three channels to be adjusted simultaneously.

14. The temperature controlled food serving bar of claim 11 wherein said temperature control system has an operator interface that allows the food holding temperature of each channel to be adjusted independent of the food holding temperatures of the other channels.

15. The temperature controlled food serving bar set forth in claim 14 wherein said temperature control system comprises a dedicated heating circuit for individually controlling electrical current flowing through each heating element.

16. The temperature controlled food serving bar as set forth in claim 1 wherein said temperature control system comprises at least two separate heating elements for heating said different temperature zones of the channel.

17. The temperature controlled food serving bar as set forth in claim 1 wherein at least one of said one or more thermal barriers is configured as a splice for connecting two adjacent channel sections to one another.

18. The temperature controlled food serving bar as set forth in claim 1 wherein at least one of said one or more thermal barriers is an air gap with no intervening structure between respective adjacent channel sections.

19. The temperature controlled food serving bar as set forth in claim 1 wherein said channel has a longitudinal axis, and wherein said plurality of thermally separate channel sections extend lengthwise of the channel along said axis.

20. The temperature controlled food serving bar as set forth in claim 1, further comprising a cabinet, and wherein said at least one channel extends lengthwise of the cabinet.

21. A temperature controlled food serving bar for serving food for human consumption, said food serving bar comprising
at least one channel of thermally conductive material having a length extending lengthwise of the food serving bar for receiving at least one food-holding pan, said at least one channel defining an elongate pan-receiving cavity extending lengthwise of the food serving bar for placement of said at least one food-holding pan in the cavity,
said at least one channel having a longitudinal axis and comprising a plurality of thermally separate channel sections extending lengthwise of the channel along said axis, each channel section of said plurality of channel sections having an open top and an open end aligned with an adjacent open end of an adjacent channel section, said channel sections comprising a plurality of temperature zones along said length of the channel, each temperature zone of the plurality of temperature zones having a different temperature, one or more thermal barriers between adjacent open ends of adjacent channel sections, said one or more thermal barriers thermally separating adjacent temperature zones of said plurality of temperature zones, and a temperature control system controlling one or more heating elements for heating different channel sections of said plurality of thermally separate channel sections to different temperatures, wherein food products in said plurality of temperature zones are capable of being held at different food holding temperatures.

22. The temperature controlled food serving bar as set forth in claim 21, further comprising a cabinet, and wherein said at least one channel extends lengthwise of the cabinet.

* * * * *